United States Patent
Hojo et al.

(10) Patent No.: US 6,819,651 B2
(45) Date of Patent: *Nov. 16, 2004

(54) COMMUNICATION SYSTEM, COMMUNICATION APPARATUS WHICH CAN BE CONNECTED TO COMMUNICATION SYSTEM, CONTROL METHOD FOR CONTROL SYSTEM, AND CONTROL METHOD FOR COMMUNICATION APPARATUS WHICH CAN BE CONNECTED TO COMMUNICATION SYSTEM

(75) Inventors: Kazuhiko Hojo, Kawasaki (JP); Atsushi Tamura, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,619

(22) Filed: Mar. 31, 1998

(65) Prior Publication Data

US 2003/0039266 A1 Feb. 27, 2003

(30) Foreign Application Priority Data

Apr. 1, 1997 (JP) .............................. 9-082734
Feb. 26, 1998 (JP) ........................... 10-045411

(51) Int. Cl.$^7$ .................... G01R 31/08; G06F 11/00; G08C 15/00
(52) U.S. Cl. .................. 370/222; 370/464; 398/59
(58) Field of Search ................ 370/469, 465, 370/466, 221, 222, 223, 224, 442, 443, 438, 439, 452; 359/115, 117, 123, 124; 398/58, 59

(56) References Cited

U.S. PATENT DOCUMENTS

| | | | | |
|---|---|---|---|---|
| 5,157,692 A | * | 10/1992 | Horie et al. | 375/260 |
| 5,406,401 A | * | 4/1995 | Kremer | 359/110 |
| 5,418,785 A | * | 5/1995 | Olshansky et al. | 359/136 |
| 5,442,620 A | * | 8/1995 | Kremer | 370/224 |
| 5,517,489 A | * | 5/1996 | Ogura | 370/223 |
| 5,796,501 A | * | 8/1998 | Sotom et al. | 359/119 |

FOREIGN PATENT DOCUMENTS

JP 8237306 9/1996

* cited by examiner

*Primary Examiner*—Bob A. Phunkulh
(74) *Attorney, Agent, or Firm*—Morgan & Finnegan, L.L.P.

(57) ABSTRACT

In order to flexibly use the transmission capacity upon transmitting a signal between node devices, the downstream node device requests the upstream node device to decrease the number of outputs in a given channel prior to insertion of a signal into that channel. The upstream node device decreases the number of outputs in that channel by, e.g., distributing the outputs in the channel to other channels in response to the request.

16 Claims, 19 Drawing Sheets

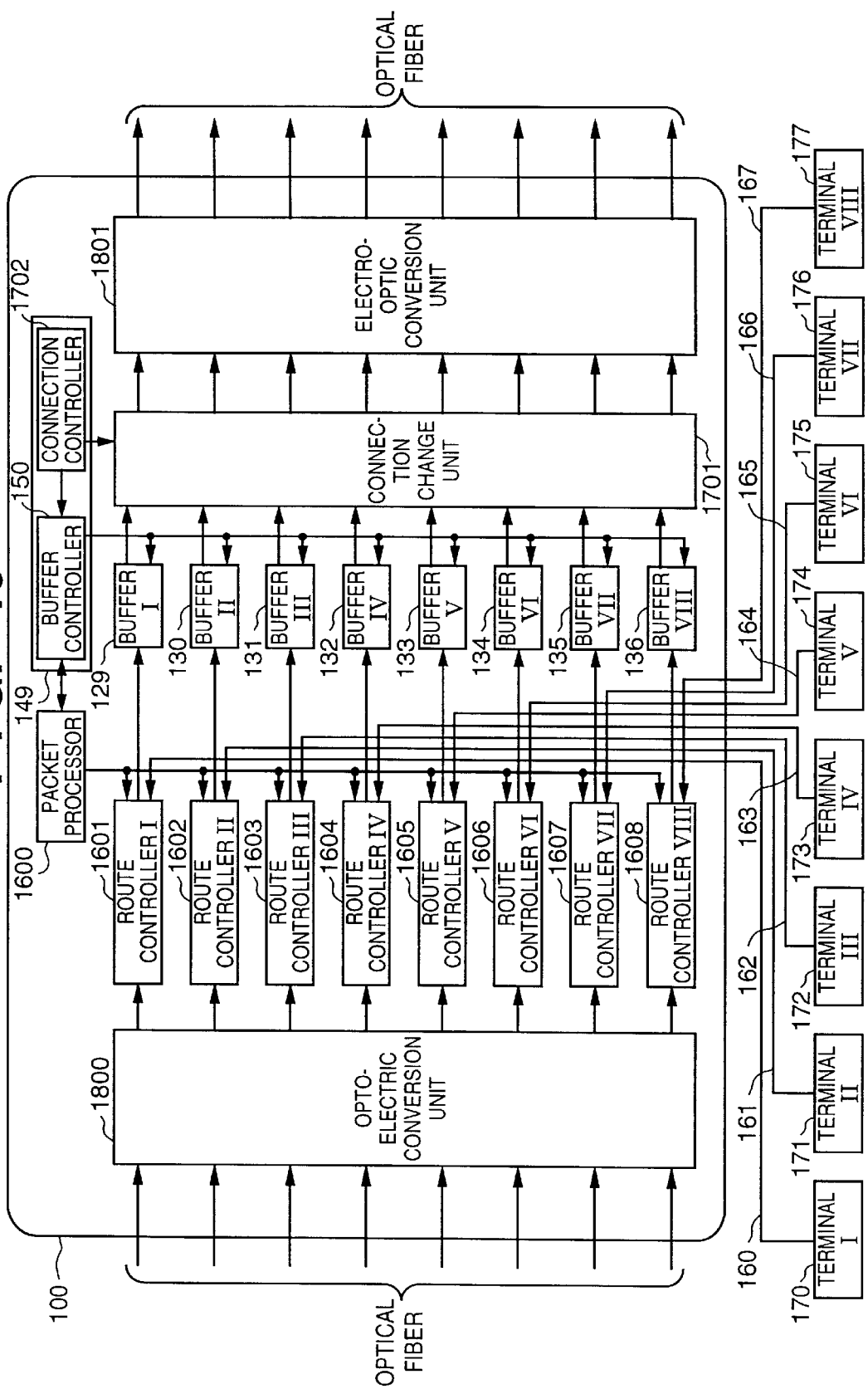

COMMUNICATION SYSTEM, COMMUNICATION APPARATUS WHICH CAN BE CONNECTED TO COMMUNICATION SYSTEM, CONTROL METHOD FOR CONTROL SYSTEM, AND CONTROL METHOD FOR COMMUNICATION APPARATUS WHICH CAN BE CONNECTED TO COMMUNICATION SYSTEM

BACKGROUND OF THE INVENTION

1. Field of the Invention

The present invention relates to a communication system, a communication apparatus which can be connected to a communication system, a control method for a communication system, and a control method for a communication apparatus which can be connected to a communication system.

2. Description of the Related Art

In recent years, as the spreads of terminal devices have increased, network architectures that can attain efficient transmission to realize high-speed networks have been studied.

In such networks, multiplex communications between nodes are attained using channels of wavelengths, frequencies, and the like, and terminal devices to be connected are determined in units of channels.

In such network, since data transmitted by a terminal device is sent while being distributed onto a plurality of multiplexed channels, the entire network can transmit a large volume of data although each channel has a small data transmission capacity.

For example, when a terminal device connected to channel 1 transmits 120-Mbps data, since that data is transmitted while being distributed onto the respective channels, each channel need only have a transmission capacity of 15 Mbps (120 Mbps/8 channels).

In such network, the transmission capacity that each terminal device can transmit is obtained by subtracting the volume of data which is already being transmitted by each channel from the maximum transmission capacity of the channel.

More specifically, in a network obtained by multiplexing 8 channels each having a maximum transmission capacity of 150 Mbps, when the respective channels are transmitting 100-Mbps data, the data volume that each terminal device can transmit additionally is 50 Mbps (150 Mbps–100 Mbps).

However, in the prior art, as described above, since the transmission capacity that each terminal device can transmit is obtained by subtracting the volume of data which is currently being transmitted by each channel from the maximum transmission capacity of the channel, the terminal device cannot transmit data beyond that capacity.

More specifically, in the entire network of the above-mentioned example, since the transmission capacity that each channel can additionally transmit is 50 Mbps, the entire network can communicate up to 400-Mbps data (50 Mbps×8 channels=400 Mbps), but each terminal device can only transmit 50-Mbps data.

SUMMARY OF THE INVENTION

It is an object of the present invention to flexibly use the transmission capacity so as to solve the above-mentioned problems.

It is another object of the present invention to effectively use the transmission capacity of the entire network.

It is still another object of the present invention to effectively use the transmission capacity which is not in use.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 19 is a block diagram showing the arrangement of a node device according to the fourth embodiment of the present invention.

DESCRIPTION OF THE PREFERRED EMBODIMENTS

Prior to the description of the present invention, the technique described in Japanese Patent Application No.

9-75541 filed by the present applicant prior to the present application will be described as a reference example so as to explain the basic arrangement of the embodiments of the present invention and to help understand the present invention.

Figure 9:
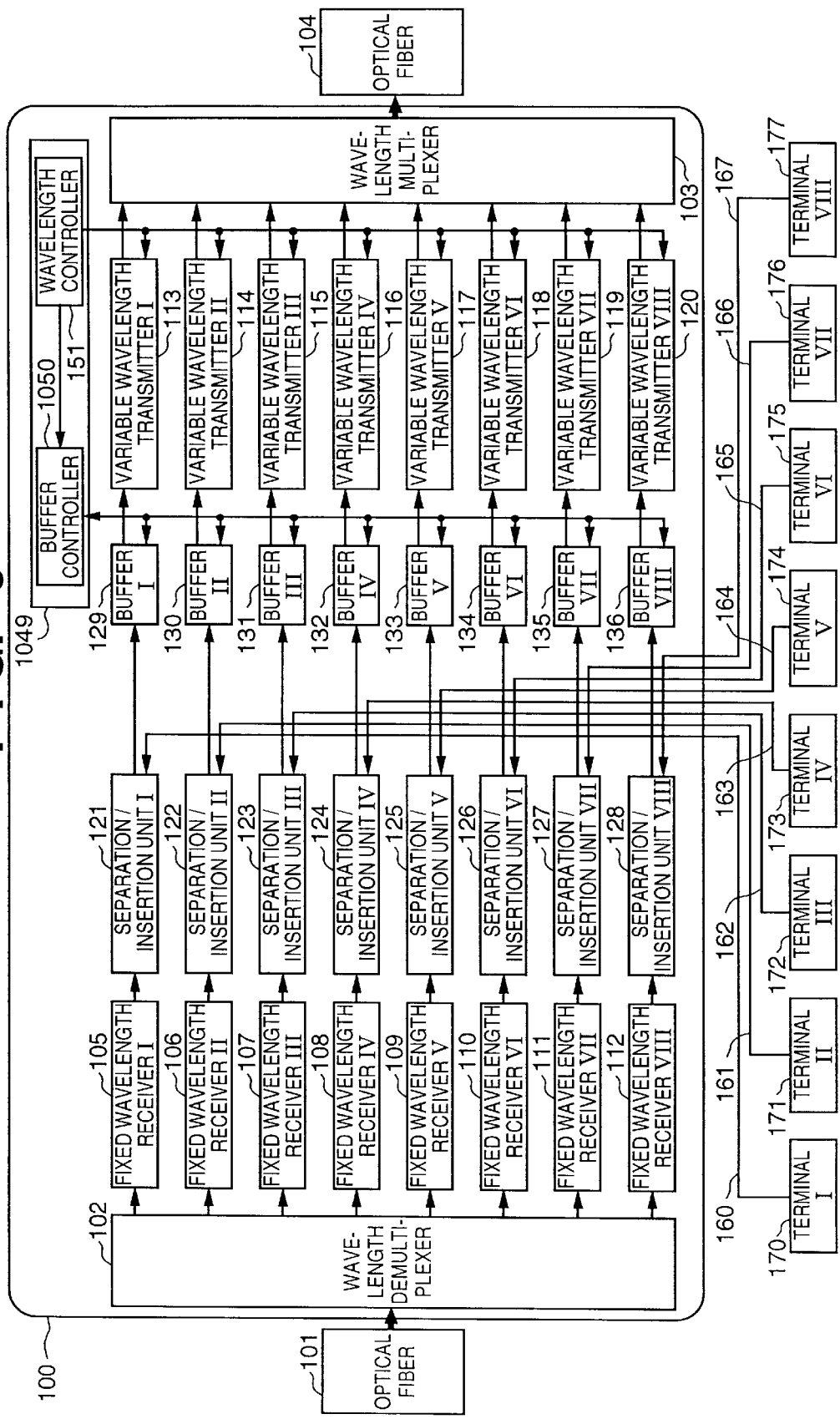
FIG. 9 is a block diagram showing the arrangement of a node device according to a reference example.

In FIG. 9, reference numeral 1049 denotes a control unit for a node device. The control unit 1049 includes a buffer controller 1050 and wavelength controller 151. Reference numeral 1050 denotes a buffer controller that controls reading of packets, to read out packets in a storage area in a dual port memory (to be described later) and in a FIFO (First In First Out) within a connection period (to be referred to as an ST unit time hereinafter) connected to a certain channel (wavelength), read out packets in another storage area and the FIFO after the unit period has passed, and then read out packets in the first storage area and FIFO after all the storage areas in the dual port memory have been accessed. Also, the buffer controller 1050 sets the read time of packets in a certain storage area and the read time of packets in the FIFO on the basis of the number of packets in that storage area and that in the FIFO. A packet is read out from a certain storage area synchronously when a variable wavelength transmitter connected to a buffer which includes the storage area transmits a wavelength corresponding to that storage area. The wavelength controller 151 controls the transmission wavelengths of variable wavelength transmitters in accordance with the patterns in predetermined transmission wavelength control tables (to be described later). Reference numeral 101 denotes an optical fiber as an optical wavelength multiplex transmission path, which serves as a transmission path between a wavelength multiplexer of an upstream neighboring node device, and a wavelength demultiplexer of the own node device. Reference numeral 102 denotes a wavelength demultiplexer which demultiplexes an optical signal sent via the optical fiber 101, and outputs demultiplexed signals to eight fixed wavelength receivers. Reference numerals 105 to 112 denote fixed wavelength receivers I to VIII as fixed wavelength reception means. Each of the fixed wavelength receivers I to VIII receives only a packet transmitted using an optical signal of one of wavelengths λ1 to λ8. For example, the fixed wavelength receiver I receives an optical signal of the wavelength λ1, the fixed wavelength receiver II an optical signal of the wavelength λ2, and the fixed wavelength receiver VIII an optical signal of the wavelength λ8.

Reference numerals 121 to 128 denote separation/insertion units, each of which separates a packet to be output onto a sub transmission path connected to the corresponding terminal from those output from the corresponding fixed wavelength receiver and outputs the separated packet onto the sub transmission path, and inserts a packet sent via the sub transmission path into the output from the corresponding fixed wavelength receiver. More specifically, a separation/insertion means comprises a separation means and insertion means, and performs signal separation prior to signal insertion. Reference numerals 129 to 136 denote buffers as storage means, each of which has a function of temporarily storing a packet output from the corresponding separation/insertion unit in a storage area corresponding to the transmission wavelength of each corresponding variable wavelength transmitter. Reference numerals 113 to 120 denote variable wavelength transmitters I to VIII as variable wavelength transmission means using tunable laser diodes (TLDs). Each variable wavelength transmitter converts a packet output from the corresponding buffer into a signal for a channel corresponding to one of the wavelengths λ1 to λ8 under the control of the wavelength controller 151, and outputs the converted signal onto an optical fiber 104 as an optical wavelength multiplex transmission path via a wavelength multiplexer 103.

Reference numeral 103 denotes a wavelength multiplexer which multiplexes eight optical signals of the wavelengths λ1 to λ8 output from the eight variable wavelength transmitters I to VIII, and outputs the multiplexed signal onto the optical fiber 104. Reference numeral 104 denotes an optical fiber as an optical wavelength multiplex transmission path. The optical fiber 104 serves as the transmission path between the wavelength multiplexer of the own node device and a wavelength demultiplexer of a downstream neighboring node device. Reference numerals 160 to 167 denote sub transmission paths I to VIII, which serve as the transmission paths of packets between the corresponding separation/insertion units and terminals. Reference numerals 170 to 177 denote terminals I to VIII respectively connected to the sub transmission paths I to VIII. Each terminal receives a packet output from the corresponding separation/insertion unit, generates a packet to be transmitted to another terminal, and transmits that packet to the separation/insertion unit via the sub transmission path.

Figure 2:
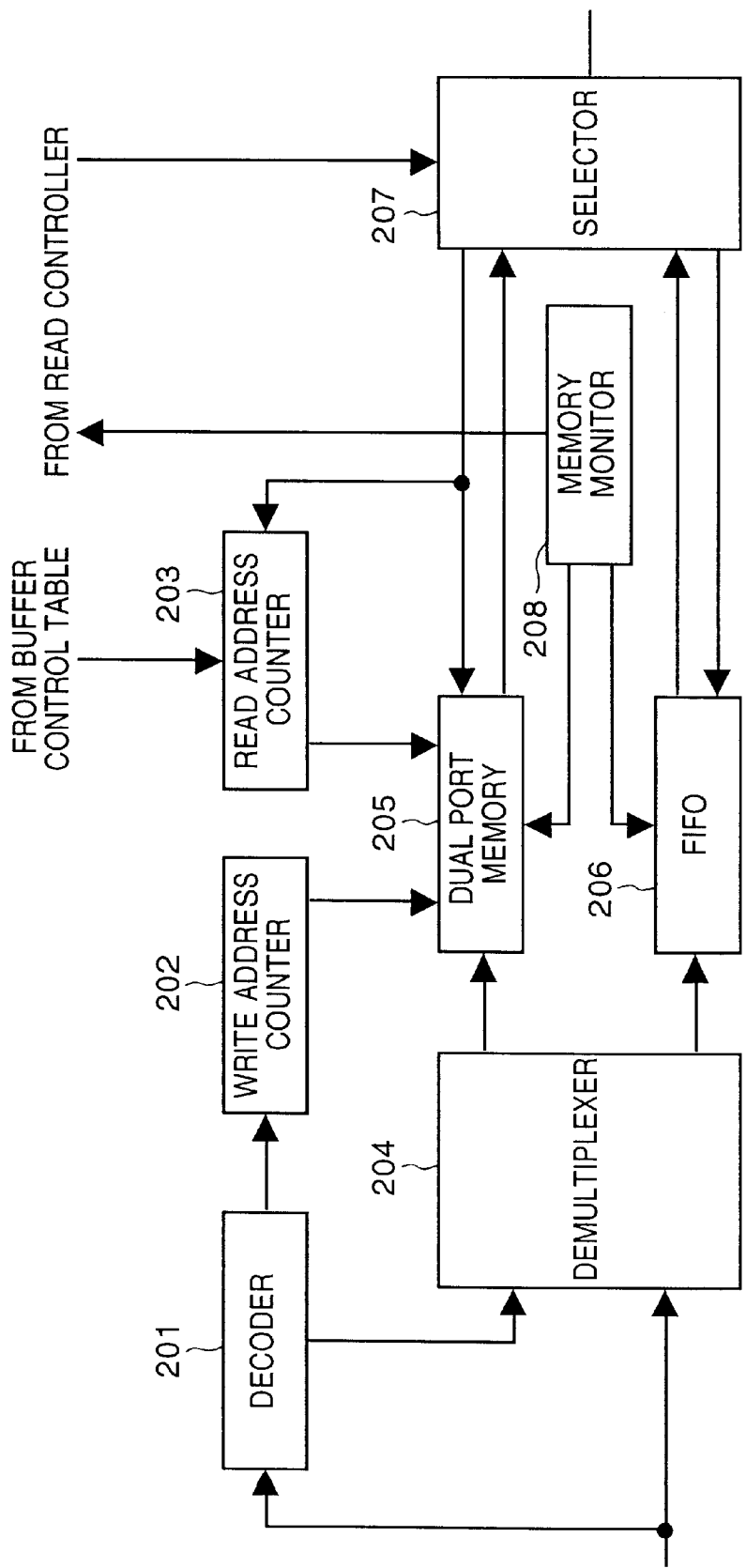
FIG. 2 is a block diagram showing the arrangement of a buffer according to the first embodiment of the present invention.

FIG. 2 shows the internal arrangement of each of the buffers I to VIII used in this node device. All the buffers have the same internal arrangement. Reference numeral 201 denotes a decoder. The decoder reads the address field of the input packet and checks if the destination of the packet is a sub transmission path connected to the neighboring node. If the destination of the packet is not a sub transmission path connected to the neighboring node, the decoder instructs a demultiplexer 204 to set its destination to be a FIFO 206. On the other hand, if the destination of the packet is a sub transmission path connected to the neighboring node, the decoder instructs the demultiplexer 204 to set its destination to be a dual port memory 205, and sends to a write address counter 202 the write start address of a storage area in which that packet is to be written. Reference numeral 202 denotes a write address counter which sequentially outputs the addresses of the storage area in which the packet is to be written on the basis of the write start address value output from the decoder 201 to the dual port memory 205. The storage area in the dual port memory 205 in which the packet is to be stored corresponds to a terminal as the destination of the packet. For example, if the packet must reach a terminal II 171 connected to the neighboring node device, since the terminal II 171 is connected to a separation/insertion unit II 122 in that node device, that packet must be input to a fixed wavelength receiver II 106 connected to the separation/insertion unit II 122 in the node device as an optical signal of the wavelength λ2. In this case, in order to convert the packet into an optical signal of the wavelength λ2, the packet must be stored in a storage area corresponding to the wavelength λ2 in the dual port memory 205. Reference numeral 203 denotes a read address counter which uses an offset value output from a buffer control table as the read start address, sequentially increments the start address in accordance with a packet output control signal from a selector 207, and outputs the incremented value to the dual port memory 205. Reference numeral 204 denotes a demultiplexer which outputs the input packet to the dual port memory 205 or FIFO 206 in accordance with an instruction from the decoder 201. Reference numeral 205 denotes a dual port memory that can independently read and write packet data. On the dual port memory 205, storage areas are assured in units of variable wavelengths that can be modulated, as shown in the memory map in FIG. 3. For example, only when the transmission wavelength of the variable wavelength transmitter is set at λ4, a packet stored in a storage area IV is read out and is output as an optical signal of the wavelength λ4 from the variable wavelength transmitter. Hence, the packets stored in the individual storage areas are converted into optical signals of the corresponding wavelengths, and the optical signals are then output from the node device. The start addresses of storage areas I to VIII are respectively A1, A2, A3, A4, A5, A6, A7, and A8. Reference numeral 206 denotes a FIFO (First In First Out) which temporarily stores input packets and outputs them in the input order to the selector. Reference numeral 207 denotes a selector which connects the output terminal of the dual port memory to the variable wavelength transmitter and outputs a packet output control signal that instructs to increment the offset value to the read address counter 203 during a dual port memory read time set by a read controller 1109 (to be described later) within the ST unit time. On the other hand, the selector 207 connects the output terminal of the FIFO to the variable wavelength transmitter and outputs a packet output control signal to the FIFO to read out a packet in the FIFO during a FIFO read time. Reference numeral 208 denotes a memory monitor, which recognizes packets input to and output from the respective storage areas in the dual port memory 205 and the FIFO, and outputs that information to the read controller 1109 (to be described later) in the buffer.

Figure 10:
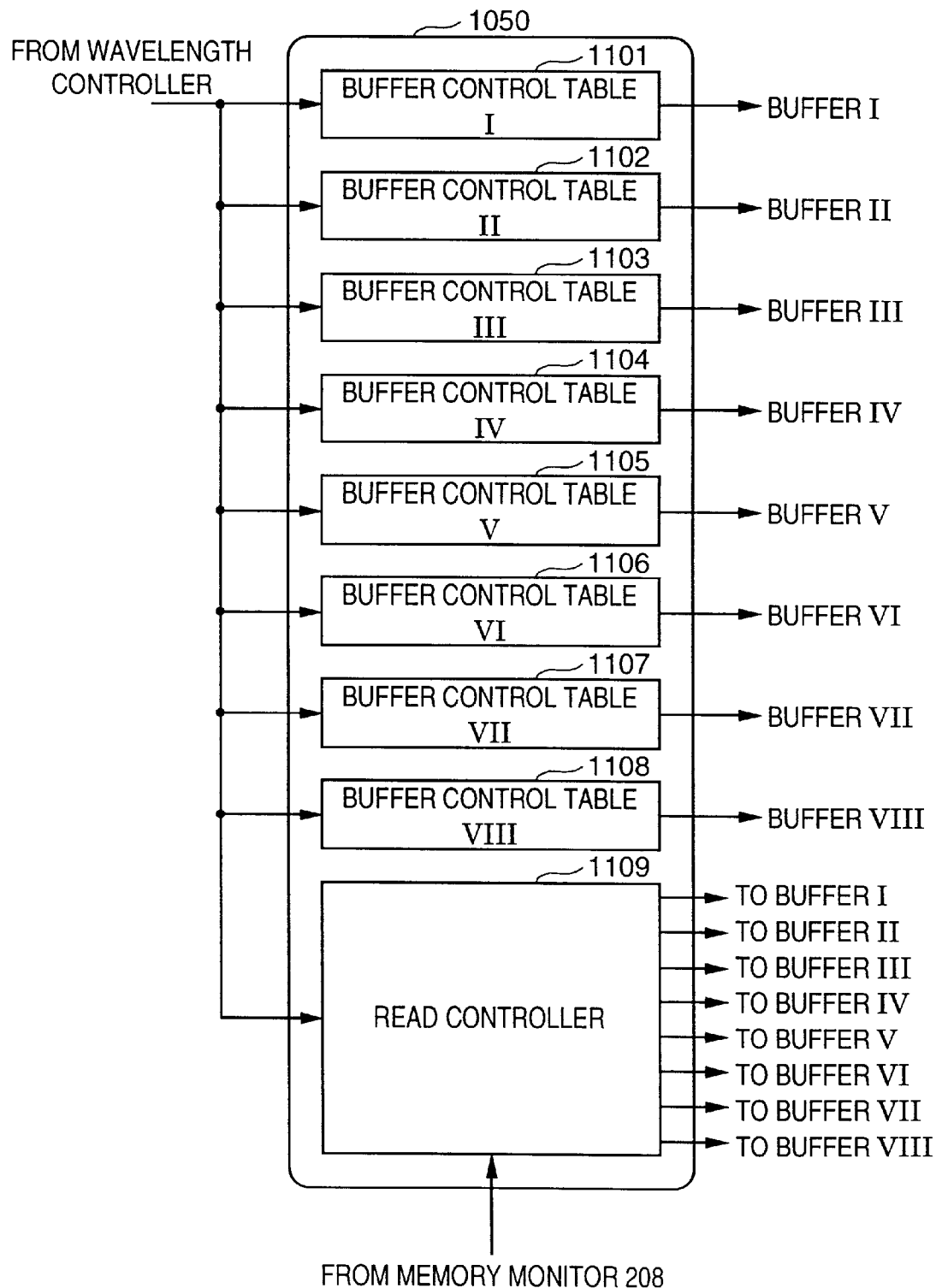
FIG. 10 is a block diagram showing the arrangement of a buffer controller according to the reference example.
Figure 11:
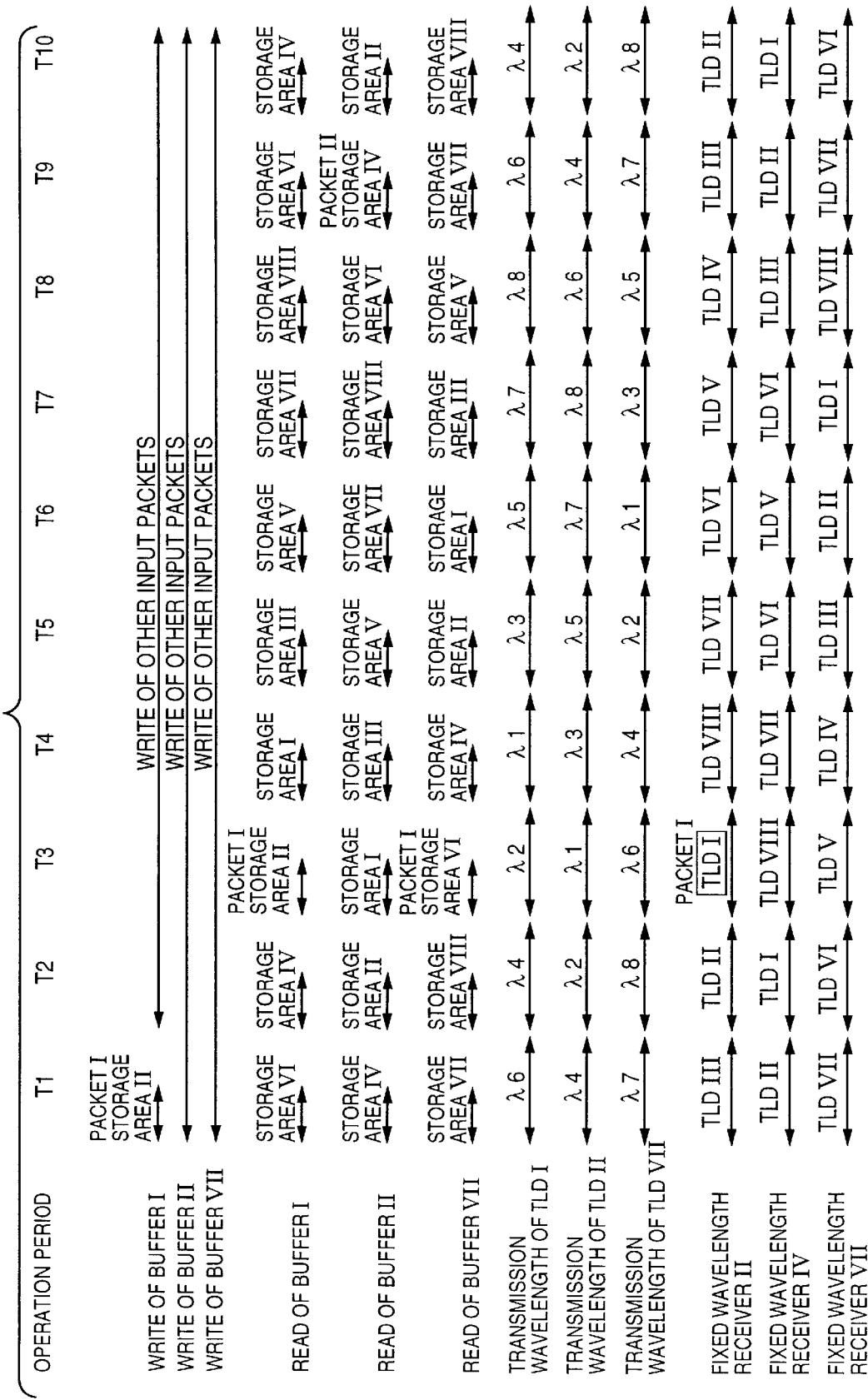
FIG. 11 is a timing chart of the reference example.

FIG. 10 shows the arrangement of the buffer controller 1050. In FIG. 10, reference numerals 1101 to 1108 denote buffer control tables I to VIII. Predetermined offset values are sequentially read out from the buffer control tables I to VIII in accordance with the address value output from a ROM counter 502 in the wavelength controller 151 (to be described later), and are output to the read address counters 203 in the buffers I to VIII. These tables are allocated on a read-only memory (ROM). The contents of the buffer control tables I to VIII will be described later. Reference numeral 1109 denotes a read controller, which requests the selector to read out packets in a predetermined storage area to be read out within each ST unit time prior to the FIFO. For example, when packets in a storage area III 303 in the dual port memory 205 are to be read out in a certain ST unit time, the read controller 1109 outputs a read grant control signal of the storage area III 303 and a read deny control signal of the FIFO to the selector 207 in the buffer I 129 during the time required for reading out all the packets in the storage area III 303. Hence, in some ST unit times, only packets stored in the storage area III 303 may be read out, and those in the FIFO 206 may not be read out. Note that the presence/absence of packets stored in a predetermined storage area in each buffer within a certain ST unit time is recognized by the memory monitor 208 in each buffer, and that recognition information is output from each memory monitor 208 to the buffer controller 1050.

Figure 5:
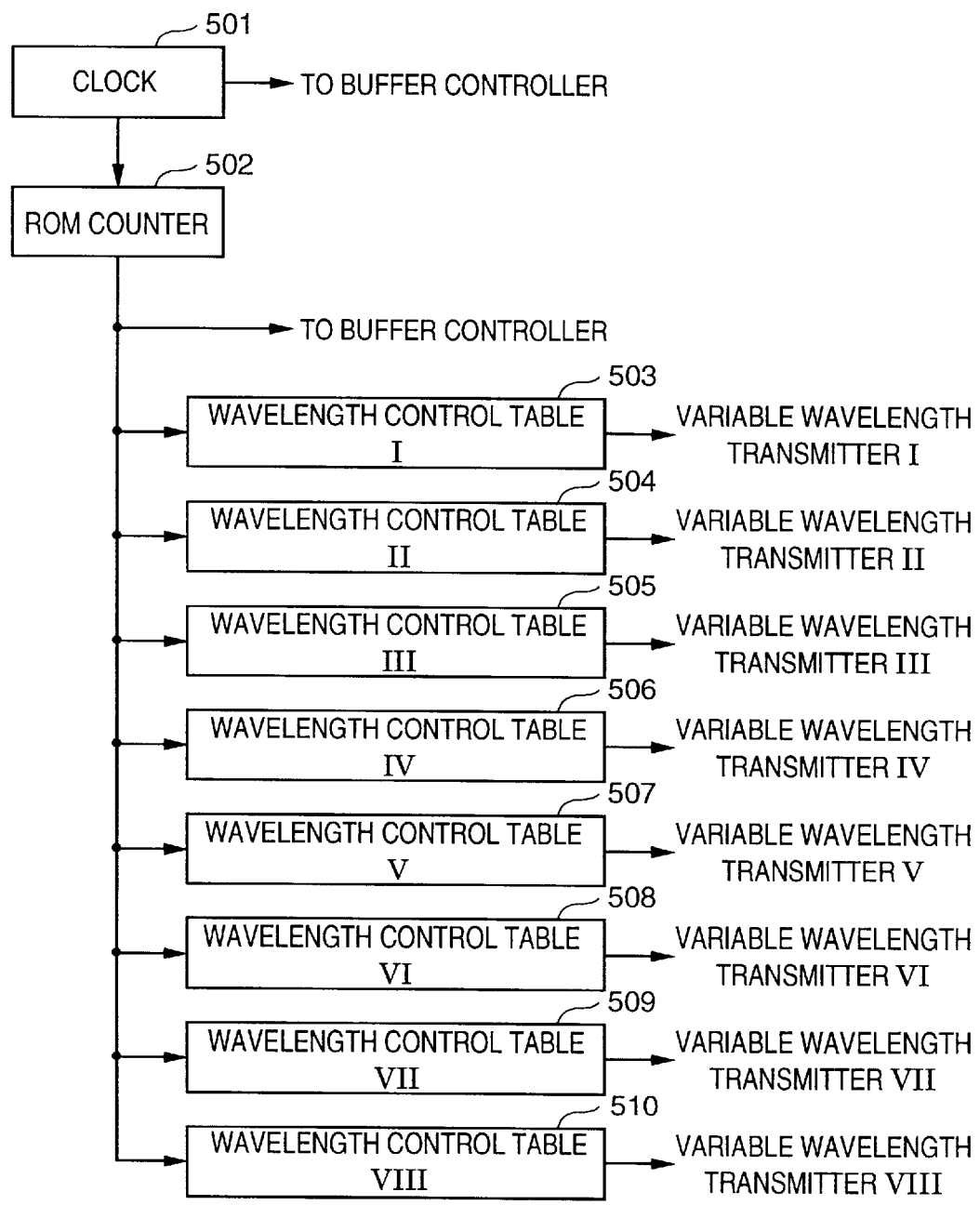
FIG. 5 is a block diagram showing the arrangement of a wavelength controller according to the first embodiment of the present invention.

FIG. 5 shows the internal arrangement of the wavelength controller 151. In FIG. 5, reference numerals 503 to 510 denote wavelength control tables I to VIII. Predetermined wavelength control signals are sequentially read out from the wavelength control tables I to VIII in accordance with the address value output from the ROM counter 502, and are output to the drivers of the variable wavelength transmitters. These tables are allocated on a read-only memory (ROM). The contents of the wavelength control tables I to VIII will be described later. Reference numeral 501 denotes a clock generator. The clock generator 501 generates a predetermined clock signal and sends it to the buffer controller. Also, the clock generator 501 frequency-divides the clock signal, and outputs the frequency-divided signal to the ROM counter.

The contents of the wavelength control tables I to VIII described above indicate wavelength shifts of optical signals to be transmitted by the variable wavelength transmitters, and are set, as shown in, e.g., Table 1 below. The offset values in the buffer control tables I to VIII are set, as shown in Table 2 below. The contents of these 16 tables are synchronously read out by the ROM counter 502. With this control, the transmission wavelength of each tunable laser diode (TLD) cyclically shifts in the order of λ1, λ3, λ5, λ7, λ8, λ6, λ4, λ2, and λ1, and the offset value for reading out the contents of the storage areas in the dual port memory in the buffer connected to each tunable laser diode (TLD) cyclically changes in the order of A1, A3, A5, A7, A8, A6, A4, A2, and A1 in synchronism with the transmission wavelength shifts of the variable wavelength transmitter. Hence, according to the wavelength and buffer control tables, packets in the storage area corresponding to the transmission wavelength of the variable wavelength transmitter, which wavelength shifts cyclically, are converted into optical signals of the corresponding transmission wavelengths of the variable wavelength transmitter, thus outputting the optical signals. The transmission wavelengths of the tunable laser diodes (TLDs) have different cyclic shift phases so as to prevent a plurality of tunable laser diodes (TLDs) from transmitting using an identical wavelength. The wavelength control tables I to VIII with such contents control the transmission wavelengths of the variable wavelength transmitters.

TABLE 1

| Table Name | Address | | | | | | | |
|---|---|---|---|---|---|---|---|---|
| | 0 | 1 | 2 | 3 | 4 | 5 | 6 | 7 |
| Wavelength Control Table I | 1 | 3 | 5 | 7 | 8 | 6 | 4 | 2 |
| Wavelength Control Table II | 3 | 5 | 7 | 8 | 6 | 4 | 2 | 1 |
| Wavelength Control Table III | 5 | 7 | 8 | 6 | 4 | 2 | 1 | 3 |
| Wavelength Control Table IV | 7 | 8 | 6 | 4 | 2 | 1 | 3 | 5 |
| Wavelength Control Table V | 8 | 6 | 4 | 2 | 1 | 3 | 5 | 7 |
| Wavelength Control Table VI | 6 | 4 | 2 | 1 | 3 | 5 | 7 | 8 |
| Wavelength Control Table VII | 4 | 2 | 1 | 3 | 5 | 7 | 8 | 6 |
| Wavelength Control Table VIII | 2 | 1 | 3 | 5 | 7 | 8 | 6 | 4 |

TABLE 2

| Table Name | Address | | | | | | | |
|---|---|---|---|---|---|---|---|---|
| | 0 | 1 | 2 | 3 | 4 | 5 | 6 | 7 |
| Buffer Control Table I | A1 | A3 | A5 | A7 | A8 | A6 | A4 | A2 |
| Buffer Control Table II | A3 | A5 | A7 | A8 | A6 | A4 | A2 | A1 |
| Buffer Control Table III | A5 | A7 | A8 | A6 | A4 | A2 | A1 | A3 |
| Buffer Control Table IV | A7 | A8 | A6 | A4 | A2 | A1 | A3 | A5 |
| Buffer Control Table V | A8 | A6 | A4 | A2 | A1 | A3 | A5 | A7 |
| Buffer Control Table VI | A6 | A4 | A2 | A1 | A3 | A5 | A7 | A8 |
| Buffer Control Table VII | A4 | A2 | A1 | A3 | A5 | A7 | A8 | A6 |
| Buffer Control Table VIII | A2 | A1 | A3 | A5 | A7 | A8 | A6 | A4 |

TABLE 2-continued

| Table Name | Address | | | | | | | |
|---|---|---|---|---|---|---|---|---|
| | 0 | 1 | 2 | 3 | 4 | 5 | 6 | 7 |
| VIII | | | | | | | | |

Figure 6:
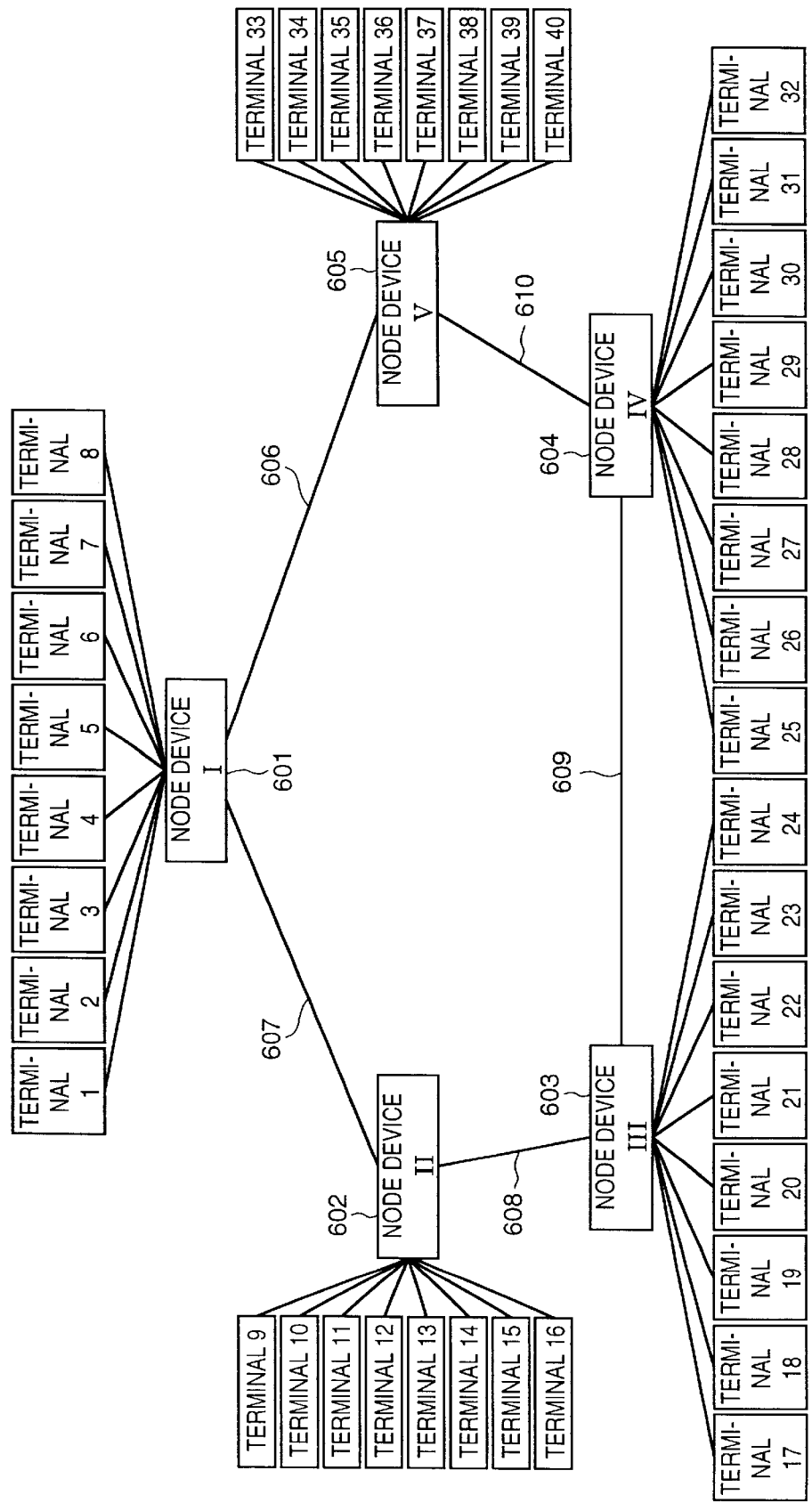
FIG. 6 is a block diagram showing the network configuration according to the first embodiment of the present invention.

FIG. 6 shows an example of the arrangement of a network system using the node device shown in FIG. 9, in which five node devices are connected via optical fibers. Reference numerals 601 to 605 denote node devices (FIG. 9) to each of which eight terminals are connected to eight sub transmission paths. Reference numerals 606 to 610 denote optical fibers serving as optical wavelength multiplex transmission paths.

The transmission control method of this network system will be explained below with reference to FIGS. 2, 3, 5, 6, 9, 10, and 11, and Tables 1 and 2.

The transmission control method will be explained while taking packet transmission as an example when the source is a terminal I 170 connected to a sub transmission path I 160 of the node device I 601, and the destination is a terminal II 171 connected to a sub transmission path II 161 of the node device II 602. Note that the same reference numerals as those in FIGS. 2, 3, 5, 6, 9, 10, and 11 denote the same constituting elements in different node devices for the sake of simplicity.

Communications of the terminal connected to the node device I 601 will be explained first. The source terminal I 170 connected to the sub transmission path I 160 of the node device I 601 adds the address of the destination terminal II 171 connected to the sub transmission path II 161 of the node device 602 to transmission data to form a packet A, and outputs the packet A to the separation/insertion unit I 121 of the node device I 601 via the sub transmission path I 160.

Since the received packet A is to be transmitted to a neighboring node device, the separation/insertion unit I 121 of the node device I 601 detects a break point of a packet flow received by the fixed wavelength receiver I 105, and inserts the packet A input via the sub transmission path I 160 into that break point, thus outputting the packet A to the buffer I 129. The decoder 201 in the buffer I 129 reads the address field of the input packet A. Since the destination of the packet A is the terminal device II 171 connected to the neighboring node device II 602, the decoder 201 connects the destination of the demultiplexer 204 to the dual port memory 205, and outputs a predetermined write start address value A2 of the packet A to the write address counter 202. The write address counter 202 then sequentially outputs addresses of the storage area in which the packet is to be written on the basis of the write start address value of the packet A to the dual port memory 205. The reason why the packet A is stored in the storage area II in the dual port memory 205 is that since the packet A must reach the terminal II 171 connected to the node device II 602 and the terminal II 171 is connected to the separation/insertion unit II 122 in the node device II 602, that packet must be converted into an optical signal of the wavelength λ2 and that optical signal must be input to the fixed wavelength receiver II 106 connected to the separation/insertion unit II 122 in the node device II 602.

Packets stored in the storage area II in the dual port memory 205 are read out only when the transmission wavelength of the corresponding variable wavelength transmitter is controlled to λ2. For this reason, the packet A is converted into an optical signal of the wavelength λ2 and the converted optical signal is output to the node device II 602 when the transmission wavelength of the corresponding variable wavelength transmitter is λ2.

However, if the destination address of the received packet, which is read out by the decoder 201 in each buffer, does not indicate any terminal connected to the neighboring node device, since the transmission channel need not be designated, the decoder 201 connects the destination of the demultiplexer 204 to the FIFO 206, and that received packet is stored in the FIFO 206.

On the other hand, the ROM counter 502 of the wavelength controller 151 in the node device I 601 simultaneously outputs the read address value to the wavelength and buffer control tables I to VIII at ST unit time intervals on the basis of the clock signal supplied from the clock generator 501. With this address value, the contents of the wavelength and buffer control tables are respectively output to the variable wavelength transmitters and buffers.

Assume that a read address value "6" is output from the ROM counter 502 to the wavelength and buffer control tables. As shown in Table 1 above, the contents read out from the wavelength control tables at that time are as follows. That is, the wavelength control table I outputs a control signal corresponding to the wavelength λ4. Similarly, the wavelength control tables II, III, IV, V, VI, VII, and VIII respectively output control signals corresponding to the wavelengths λ2, λ1, λ3, λ5, λ7, λ8, and λ6. These control signals are input to the variable wavelength transmitters connected to these wavelength control tables. The variable wavelength transmitters output optical signals of the predetermined wavelengths based on these control signals.

Also, as for the contents to be read out from the buffer control tables in response to the read address value "6" from the ROM counter 502, as shown in Table 2 above, the buffer control table I outputs an offset value A4 corresponding to the storage area IV, and in like manner, the buffer control tables II, III, IV, V, VI, VII, and VIII respectively output offset values A2, A1, A3, A5, A7, A8, and A6 corresponding to the storage areas II, I, III, V, VII, VIII, and VI. These offset values are output to the read address counters 203 of the buffers I to VIII.

The read controller 1109 in the buffer controller 1050 recognizes the ST unit time interval upon change in read address value from the ROM counter 502, and outputs a dual port memory read grant control signal and a FIFO read deny control signal to the selector 207 in each buffer, so as to preferentially read out packets in predetermined storage areas to be read out within a certain ST unit time. That is, only when no packets to be read out remain in a predetermined storage area in each dual port memory within the ST unit time, the read controller 1109 outputs a FIFO read grant control signal and dual port memory read deny control signal to the selector 207 in the buffer including that storage area. In response to these signals, the selector 207 connects the output terminal of one of the FIFO 206 and dual port memory 205 to the variable wavelength transmitter, and supplies a packet output grant control signal to the FIFO 206 or the read address counter 203 connected to the dual port memory 205. The read controller 1109 execute a series of operations at ST unit time intervals while changing the predetermined storage area to be read out.

Upon receiving an offset value A4, the read address counter 203 in the buffer I 129 loads this offset value A4, sequentially increments the loaded value in accordance with the packet output grant signal from the selector 207, and outputs the incremented values to the dual port memory 205. Note that the packet output grant signal from the selector 207 is output in accordance with the dual port memory read grant signal and FIFO read deny control signal sent from the read controller 1109. With this control, the packet read out from the storage area IV in the buffer I is converted into an optical signal of the wavelength λ4 by the variable wavelength transmitter I 113.

Therefore, in response to the read address value "6" from the ROM counter 502, the transmission wavelength of the variable wavelength transmitter I 113 is set at λ4, and a packet is read out from the storage area IV of the dual port memory 205 corresponding to this wavelength. In this case, since the packet A is stored in the storage area II but not in the storage area IV in the buffer I 129, it is not output to the variable wavelength transmitter I 113.

If all the packets in the storage area IV in the buffer I 129 are read out within that ST unit time, the read controller 1109 outputs a FIFO read grant control signal and dual port memory read deny control signal for the buffer I 129 to the selector 207.

The ROM counter 502 in the wavelength controller 151 counts the clock signal from the clock generator 501, and simultaneously outputs a read address value "7" to the wavelength and buffer control tables I to VIII. At this time, the contents read out from the wavelength control table I 502 are a control signal corresponding to the wavelength λ2 shown in Table 1 above. The control signal corresponding to the wavelength λ2 is output to the variable wavelength transmitter I 113 connected to the wavelength control table I. The variable wavelength transmitter I 113 outputs an optical signal of the wavelength λ2 in accordance with that control signal.

The read address value "7" output from the ROM counter 502 in the wavelength controller 151 is also output to the buffer control tables I to VIII in the buffer controller 1050 to read out their contents. At this time, the contents read out from the buffer control table I are an offset value A2 corresponding to the storage area II shown in Table 2 above.

Meanwhile, the read controller 1109 recognizes the next ST unit time interval upon change in read address value from the ROM counter 502, and outputs a dual port memory read grant control signal and FIFO read deny control signal to each selector 207 in accordance with the presence/absence of packets in the predetermined storage area in the corresponding buffer. In response to these signals, the selector 207 in the buffer I 129 connects the output terminal of the dual port memory 205 to the variable wavelength transmitter I 113. The read address counter 203 in the buffer I 129 loads the input offset value A2, sequentially increments the loaded value in accordance with the packet output grant signal sent from the selector 207, and outputs the incremented values to the dual port memory 205.

Hence, after the packet A in the storage area II in the dual port memory 205 passes through the selector 207, and is converted into an optical signal of the wavelength λ2 by the variable wavelength transmitter I 113, the optical signal is output to the wavelength multiplexer 103.

The variable wavelength transmitters II 114 to VIII 120 convert packets output from the buffers II 130 to VIII 136 into optical signals of predetermined wavelengths on the basis of the wavelength control signals received from the wavelength controller 151, and output these signals to the wavelength multiplexer 103. The wavelengths of the optical signals output at that time are: λ1 from the variable wavelength transmitter II 114; λ3 from the variable wavelength transmitter III 115; λ5 from the variable wavelength transmitter IV; λ7 from the variable wavelength transmitter V; λ8 from the variable wavelength transmitter VI; λ6 from the variable wavelength transmitter VII; and λ4 from the variable wavelength transmitter VIII, as described above. In this way, since the optical signals output from the eight variable wavelength transmitters have different wavelengths under the control of the wavelength controller 151, the optical signals of all the wavelengths are multiplexed by the wavelength multiplexer 103 without influencing each other, enter the optical fiber 104 (607 in FIG. 6), and are transmitted to the downstream neighboring node device II 602.

Communication operations of the node device II 602 will be explained below. The packet A that has been converted into the optical signal of the wavelength λ2 and sent via the optical fiber 607 is received by only the fixed wavelength receiver II 106 in the node device II 602.

The received optical signals are separated by the separation/insertion unit II 122 into packets to be sent to the buffer II 130, and the packet A to be sent to the sub transmission path II 161. The packet A is then transmitted to the destination terminal II 171, thus completing transmission of the packet A.

In case of the system of the above-mentioned reference example, the capacity of a signal that can be inserted from the sub transmission path into each channel is obtained by subtracting the transfer capacity which is input from the upstream node device to the separation/insertion unit and is output to the buffer without being separated from the maximum output capacity that the separation/insertion unit can output the buffer. For example, if the maximum capacity is 150 Mbps (megabytes per sec; the number of bytes that can be output per second expressed in units of megabytes), and the transfer capacity which is input from the upstream node device to the separation/insertion unit and is output to the buffer without being separated is 100 Mbps, the information volume that the terminal connected to the sub transmission path can output is 50 Mbps or less.

In consideration of such problem, according to the present invention, the downstream node device controls the upstream node device to flexibly use the transmission capacity.

The communication method of the present invention has the following arrangement.

That is, a communication method in a network system having a channel for transmitting a signal, a first node device which outputs a signal using the channel, and a second node device which inserts a signal into the channel with which the first node device has output the signal, is characterized in that the second node device requests the first node device to control the signal output of the channel to which the second node device is about to output a signal so as to allow insertion of a signal into the channel in which the second node device is about to insert the signal, prior to signal insertion.

The first node device need not control the output of all the signals to be output using the channel in which the second node device is about to insert a signal, in accordance with the request from the second node device, but need only control the output of a signal which is output via a unit that implements the insertion in the second node device. Note that the unit that implements the insertion corresponds to the insertion means (the insertion means of the separation/insertion unit of the above reference example) in the above-mentioned reference example, and to an insertion means of a route controller in an embodiment to be described below.

The output control of signals in the channel with which the second node device is about to output a signal in the first node device need only decrease the number of signal outputs in that channels, or stop the signal outputs in that channel. The number of outputs to be decreased can be appropriately set in accordance with the capacity required for the second node device and the capacity that the first node device must output. When the first node device can also output signals to another channel, the number of outputs to be decreased may be determined in consideration of the capacity that can be distributed to the other channel. The capacity in the above and following descriptions can be considered as the output volume of information per unit time.

Also, the present invention can also use an arrangement in which whether or not the second node device issues a request is determined by discriminating in the second node device on the basis of a signal (its capacity and the like) input from the first node device to the second node device whether or not the first node device can control the output in accordance with the request from the second node device, and an arrangement in which the second node device issues a request independently of the state of the first node device, the first node device determines if it is to operate according to that request and supplies the determination result to the second node device, and the second node device starts insertion of a signal in accordance with the received result.

In arrangement, the second node device may start insertion of a signal a proper time after it issues the output control request to the first node device. However, depending on the setups of that proper time, the first node device must perform idle output control or the second node device may start insertion of a signal before the first node device starts output control. For this reason, preferably, a message indicating that the first node device is going to start or has completed the output control in accordance with the request from the second node device is supplied to the second node device, and the second node device starts signal insertion upon reception of the message.

In the network of the present invention, the first and second node devices may be connected via a plurality of parallel channels. In such arrangement, when the second node device is about to insert a signal in the first channel of the plurality of channels, the first node device may control the signal output in the first channel in accordance with the request from the second node device.

The node device according to the present invention has the following arrangement.

That is, a node device used in a network system which is built by connecting a plurality of node devices via a channel for transmitting a signal, and transfers a signal between given node devices, is characterized by having an output means for outputting a signal onto the channel, and a control means for controlling the volume of a signal which is output from the output means onto the channel in accordance with a request from another node device to which the signal output from the output means is input.

When the network system connects the node devices via a plurality of channels, the control means may control the volume of a signal to be output from the output means onto the first channel in accordance with an output control request for the first channel of the plurality of channels from the other node device.

The output means may have a storage means for storing the signal to be output, and a channel change means for connecting the storage means to one of the plurality of channels so as to output the signal arriving from the storage means onto one of the plurality of channels. In this arrangement, when the channel change means changes the channel to which the storage means is to be connected, in accordance with a predetermined pattern, the channel change means can be controlled in accordance with the destination of the signal to be output from the storage means, thus obviating the need for determining any output channel, and reducing the control load. The channel change means may have a variable channel transmission means that can output the signal output from the storage means using one of the plurality of channels, and one of the plurality of channels to be connected to the storage means may be changed by changing an outputtable channel of the variable channel transmission means. Alternatively, the channel change means may have a connection change unit having an input terminal corresponding to the storage means and output terminals corresponding to the plurality of channels, and one of the plurality of channels to be connected to the storage means may be changed by changing the connection between the input and output terminals of the connection change unit.

Also, the output means may have a storage means for storing a signal to be output and outputting the stored signal from a plurality of output units, and a channel change means for simultaneously connecting the plurality of output units to different ones of the plurality of channels so as to output signals arriving from the plurality of output units to any of the plurality of channels. In this arrangement, when the channel change means changes the channels to be connected to the plurality of output units in accordance with a predetermined pattern, the need for controlling the channel change means in accordance with the destination of a signal to be output from each output unit can be obviated. Also, when the predetermined pattern is defined to simultaneously connect the plurality of output units to different channels, the need for arbitration control in accordance with the destination of a signal to be output from each output unit can also be obviated. Hence, the control load can be greatly reduced.

In the present invention, since the use state or the like of each channel is monitored, and an output control request is sent to another node device on the basis of the monitoring result, the node device itself preferably has a packet processing means for generating and receiving a packet for the request. On the other hand, when the request signal or a message signal indicating acceptance of the request is transmitted using the channel, the node device preferably has a means for separating the signal from the channel, and supplying the signal to the packet processing means. In the embodiment to be described below, that function is given to the separation/insertion means in the reference example, and is called a route controller.

A network system of the present invention is a network system which is built by connecting a plurality of node devices via a channel for transmitting a signal, and transfers a signal between given node devices, characterized in that at least a first node device of the plurality of node devices comprises the above-mentioned node device.

The network system may have an arrangement with a separation means for separating a desired signal of those sent on the channel from the channel, or an arrangement in which the separation means is arranged in the node device. As in the above reference example or the embodiment to be described below, when the signal format (electrical signal) in the node device is different from the signal format (optical signal) between neighboring node devices, and signal format conversion is required for the control such as separation, insertion, and channel selection, a unit that implements separation, insertion, and channel selection is preferably included in the node device since the number of times of signal format conversion can be reduced. Even when no optical signal is used between neighboring node devices, when the signal format suitable for transmission between neighboring node devices is different from that for signal processing, a unit that implements the signal processing is preferably incorporated in the node device. Such arrangement also has merits in terms of network management.

When the separation means is provided in a second node device that receives a signal output from the first node device and the second node device is the other node device, and separates a signal by the separation means and then inserts a signal into the channel from which the signal was separated, the control means of the first node device need only control the output of a signal which is not separated by the separation means of the second node device, of the signals which are output from the first node device onto the channel.

The first node device outputs a signal to be separated by the separation means of the second node device while designating its output channel so as to output the signal using a channel to which the separation means is connected, and a signal which undergoes the output control of the control means of the first node device in accordance with a request from the second node device is a signal, the output channel of which is not designated, thus allowing easy control. Especially, when the first node device stores a signal to be output while designating its output channel, and a signal to be output without designating any output channel at different locations in advance, the control of the control means is also facilitated. Furthermore, the signal to be output while designating its output channel is preferably stored in units of output channels.

[First Embodiment]

Figure 1:
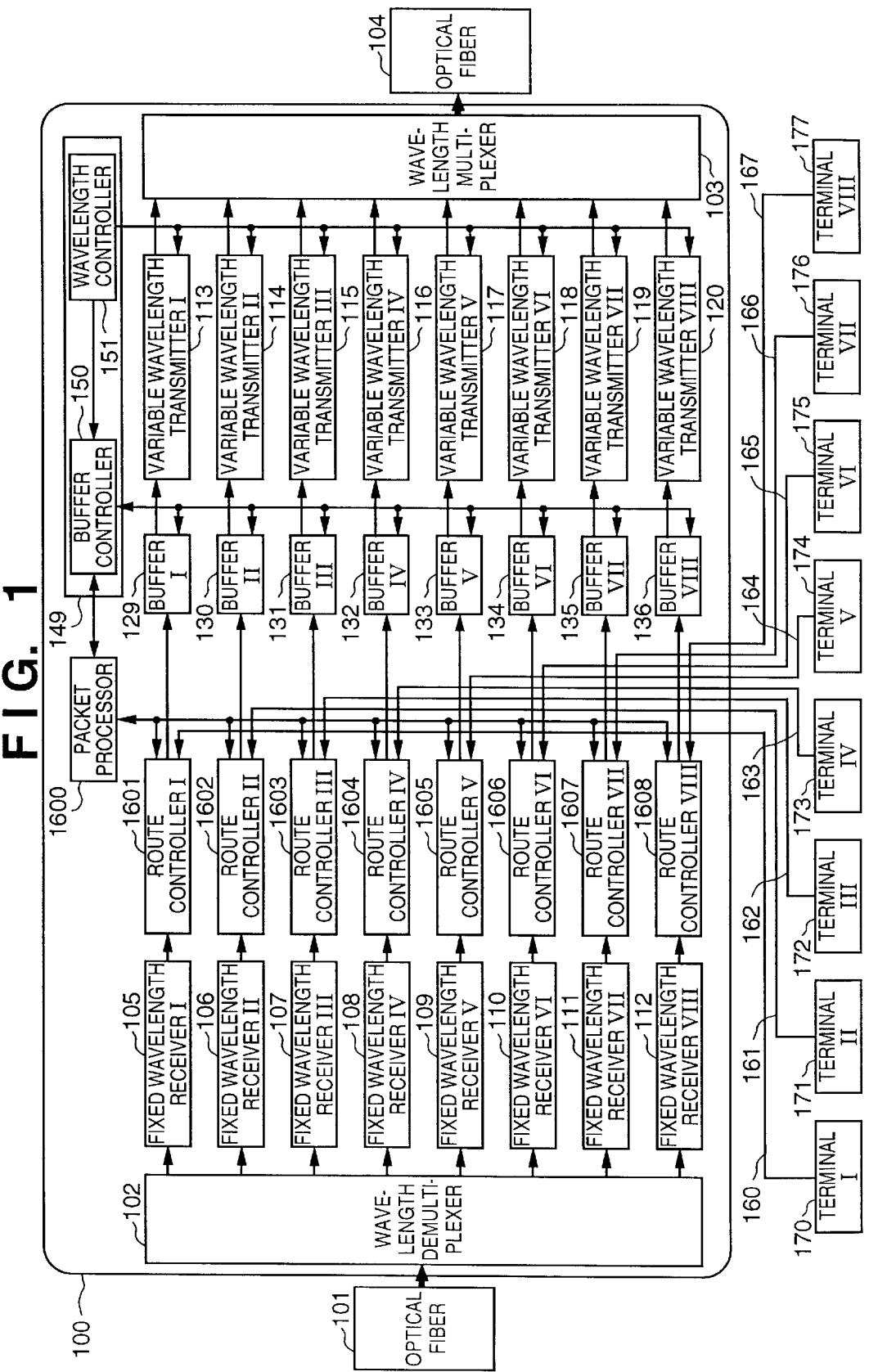
FIG. 1 is a block diagram showing the arrangement of a node device according to the first embodiment of the present invention.

FIG. 1 shows the arrangement of a node device according to one embodiment of the present invention. This node device is substantially the same as that used in the reference example, except that the device comprises a packet processor 1600 used in communications with another node device or with terminals connected, and route controllers I 1601 to VIII 1608 obtained by adding functions of separating signals to the packet processor and outputting signals from the packet processor to the buffers or sub transmission paths to the separation/insertion units. Also, the arrangement of the read controller is different from that in the reference example. The packet processor outputs a packet pertaining to the read control of buffers to a buffer controller, and receives a packet sent from the buffer controller.

Note that the operation and functions of fixed wavelength receivers, buffers, and variable wavelength transmitters as components of the node device are the same as those used in the node device of the reference example, and a wavelength controller in a control unit is also the same as that in the reference example. Therefore, a description of the operations that have already been described in the reference example will be omitted in FIG. 1.

The present invention relates to a node device which controls the output of a packet to a downstream node device. This node device is designed to allow a certain terminal to output information having a capacity exceeding the free capacity of the connected channel. More specifically, the upstream node device distributes packets to be output to a certain channel to the downstream node device to other channels to make that channel available, and a transmitting terminal connected to the channel sends a packet with the required capacity onto the channel made available. Hence, the present invention effectively functions when the sum of the packet capacity output from the upstream node device and that output from the transmitting terminal is equal to or smaller than the capacity that one node device can process.

Figure 4:
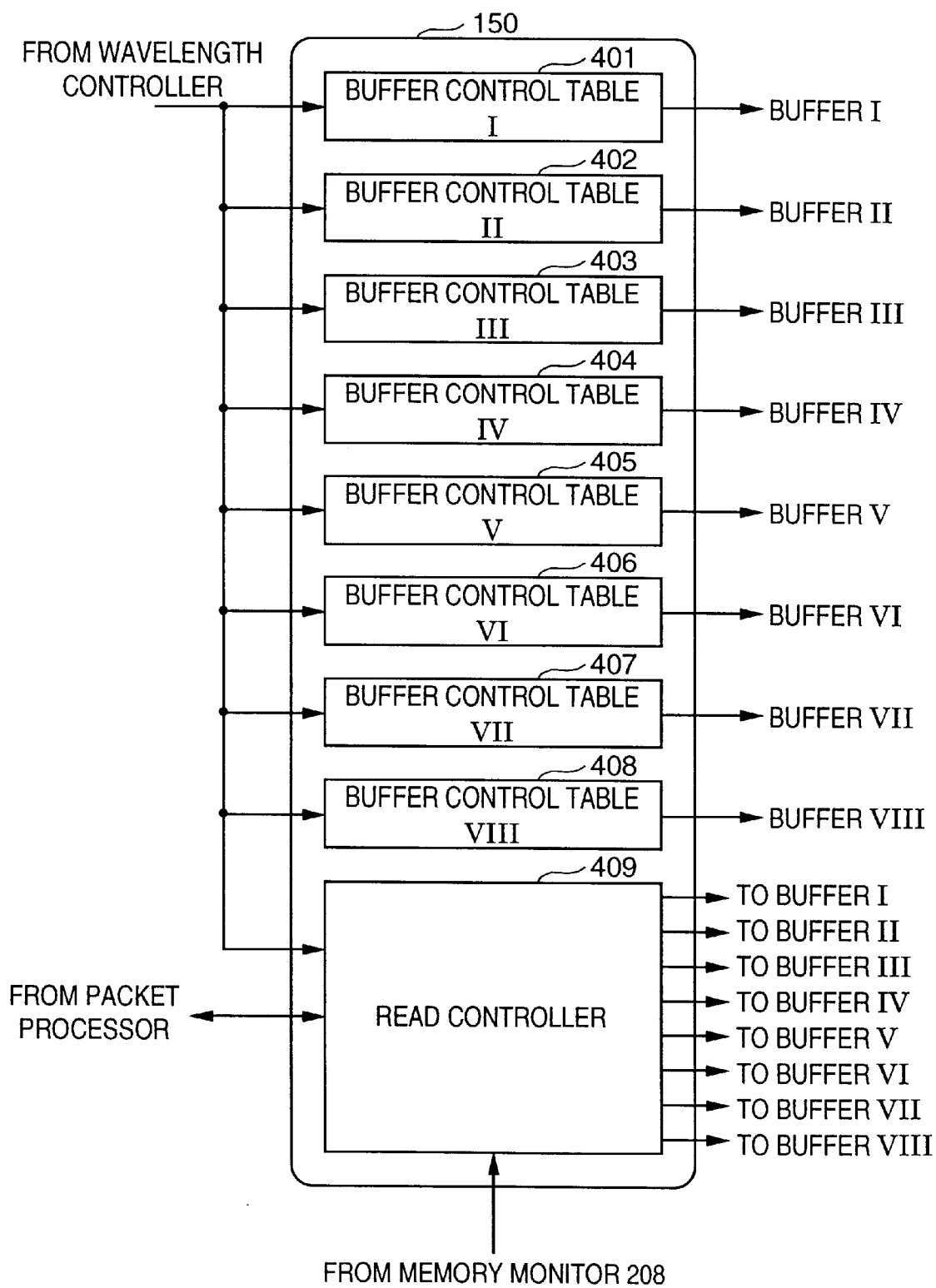
FIG. 4 is a block diagram showing the arrangement of a buffer controller according to the first embodiment of the present invention.

In order to achieve such processing, a node device according to an embodiment of the present invention comprises a packet processor 1600 and a read controller 409 with a new function (FIG. 4).

Reference numeral 1600 denotes a packet processor which has a function of outputting a packet including information pertaining to the buffer control to the read controller 409 in a buffer controller, and receiving a packet output from the read controller 409.

Reference numeral 150 denotes a buffer controller which comprises the read controller 409 with a new function, and controls read of packets from buffers in the own node device in accordance with the transmission capacity of a communication channel which is to start a communication in the immediate downstream node device.

Figure 15:
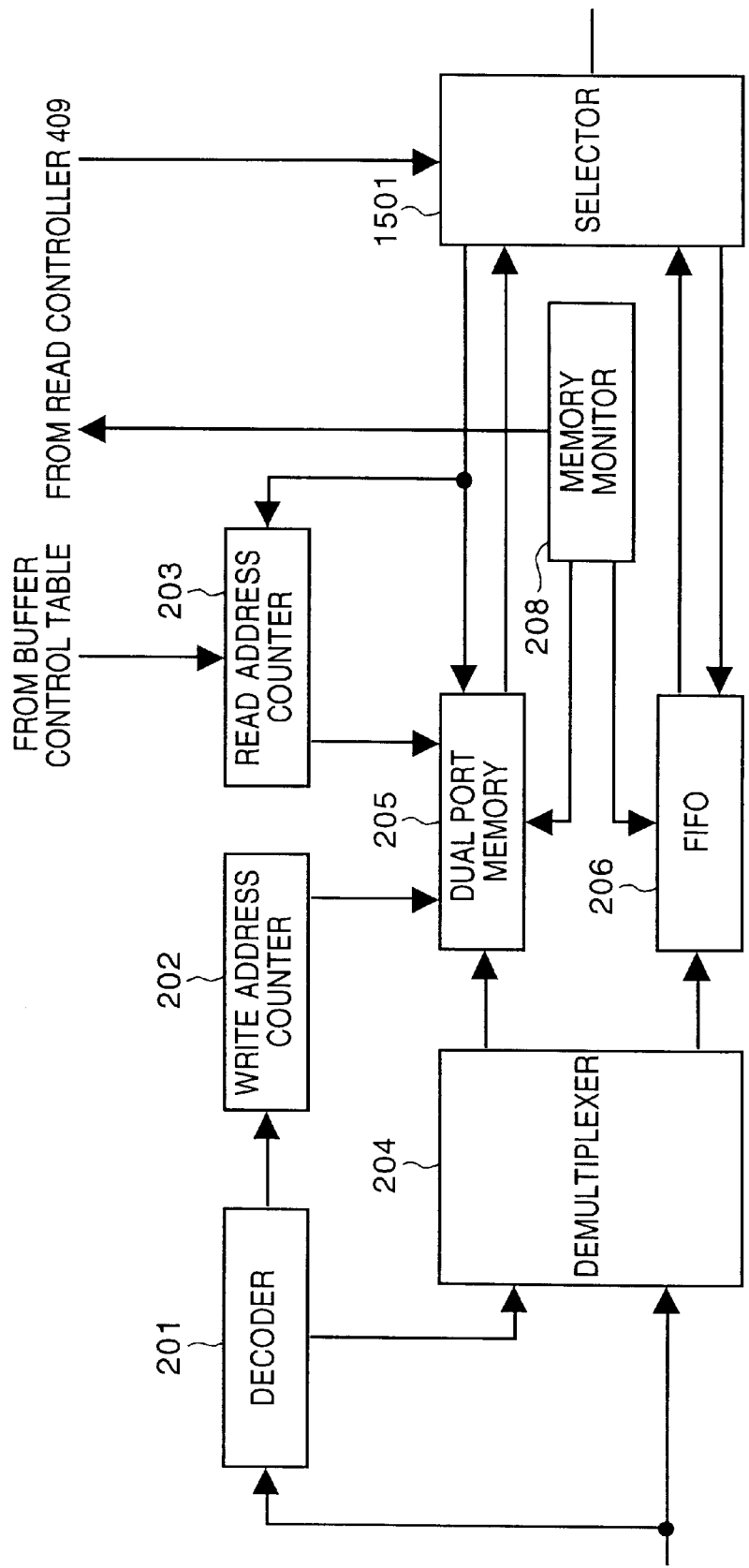
FIG. 15 is a block diagram showing the arrangement of a buffer unit according to the third embodiment of the present invention.

FIG. 15 shows the internal arrangement of buffers I to VIII used in this node device. The components of each buffer of the node device of this embodiment are substantially the same as those used in the buffer of the above-mentioned reference example, except for a selector 1501. The operation sequence of the selector 1501 is partially different from that of the selector 207 in the reference example.

The selector 207 of the reference example connects the output terminal of one of the corresponding storage area or FIFO to the variable wavelength transmitter in accordance with a dual port memory read grant control signal, FIFO read denial control signal, and the like sent from the read controller 1109, and packets are output from the storage area or FIFO as long as they are stored. However, the selector 1501 in the node device of this embodiment often stops packet output from both the corresponding storage area and FIFO in accordance with dual port memory and FIFO read denial control signals supplied from the read controller 409.

Figure 3:
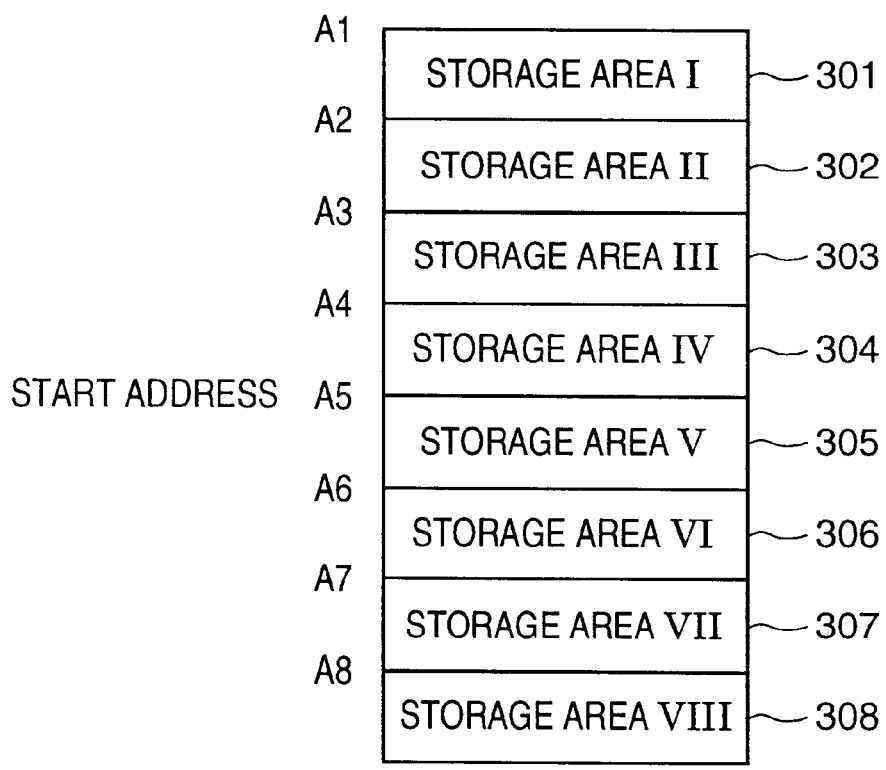
FIG. 3 shows the memory map of a dual port memory according to the first embodiment of the present invention.

The storage areas in a dual port memory 205 are the same as those in FIG. 3 described above in the reference example.

FIG. 4 shows the internal arrangement of the buffer controller 150. In FIG. 4, reference numerals 401 to 408 denote buffer control tables I to VIII described in the reference example. Reference numeral 409 denotes a read controller, which determines the read time of packets in a storage area within the ST unit time on the basis of the presence/absence of packets in the dual port memory 205 and a FIFO 206, which is determined by a memory monitor 208 in each buffer. Also, when information sent from the packet processor 1600 is the one concerning the output control of packets from the FIFO after packets are read out from a certain storage area, the read controller 409 stops the read of packets from that FIFO even within the time set as the FIFO packet read time, on the basis of the information.

More specifically, the read controller 409 outputs read grant and denial control signals for the dual port memory 205 and read denial and grant control signals for the FIFO 206 to the selectors 1501 in the buffers on the basis of the presence/absence of packets in the respective storage areas determined by the memory monitors 208 in buffers I 129 to VIII 136. The storage area in which the presence/absence of packets is to be checked is changed at ST unit time intervals, as has been described in the reference example. More specifically, within the ST unit time with a read address value "6" from a ROM counter 502, the memory monitors 208 in the respective buffers check the presence absence of packets in the storage area IV of the buffer I, the storage area II of the buffer II, the storage area I of the buffer III, the storage area III of the buffer IV, the storage area V of the buffer V, the storage area VII of the buffer IV, the storage area VIII of the buffer VII, and the storage area VI of the buffer VIII, and output that information to the read controller 409. While packets are stored in the checked storage area, the read controller 409 outputs a read grant control signal for the dual port memory 205 and a read denial control signal for the FIFO 206 to the selector 1501 in the buffer including that storage area. After all the packets are read out from that storage area, the read controller 409 outputs a read denial control signal for the dual port memory 205 and a read grant control signal for the FIFO 206 to the selector 1501 in the buffer which includes the storage area.

Upon receiving a packet which instructs to stop the output of packets from the FIFOs after packets are read out from the predetermined storage areas in all the buffers, the read controller 409 directs the selectors 1501 to stop the output of packets from the FIFOs in the FIFO read time after packets are read out from these storage regions within an ST unit time. In the ST unit time, packets are read out from a storage area first, and are then read out from the FIFO in the remaining time. In this case, the read of packets from the FIFO after packets are read out from a certain storage area means reading out packets from the FIFO in that remaining time. On the other hand, when the output of packets from the FIFOs after packets are read out from given storage areas in all the buffers is stopped, the output of packets from the FIFOs after packets are read out from the storage areas with an identical serial number in the dual port memories 205 of the respective buffers is stopped. Assuming that the output of packets from the FIFOs after packets are read out from the storage areas IV in all the buffers is stopped, the following control is made in practice. When the read from the FIFO 206 is stopped during the time in which packets are to be read out from the FIFO 206 upon completion of read of packets from the storage area IV in a certain buffer, in a certain ST unit time, and when the stop time has elapsed, packets are read out from the storage area IV to be read out in the next ST unit time, and the read of packets from the FIFO 206 is stopped in the remaining time, thereby stopping the read of packets from the FIFO 206 after packets are read out from the storage area IV in each buffer.

As another function, the read controller 409 has a function of determining the control contents associated with the output of packets to the upstream node device that outputs packets to the own node device, in consideration of a communication request from a transmitting terminal, and outputting a packet that describes the information to the packet processor 1600.

FIG. 5 shows the internal arrangement of a wavelength controller 151, as has been described in the reference example. The clock generator 501 generates a predetermined clock signal and sends it to the buffer controller 150. Also, the clock generator 501 frequency-divides the clock signal, and outputs the frequency-divided signal to the ROM counter 502.

Figure 7:
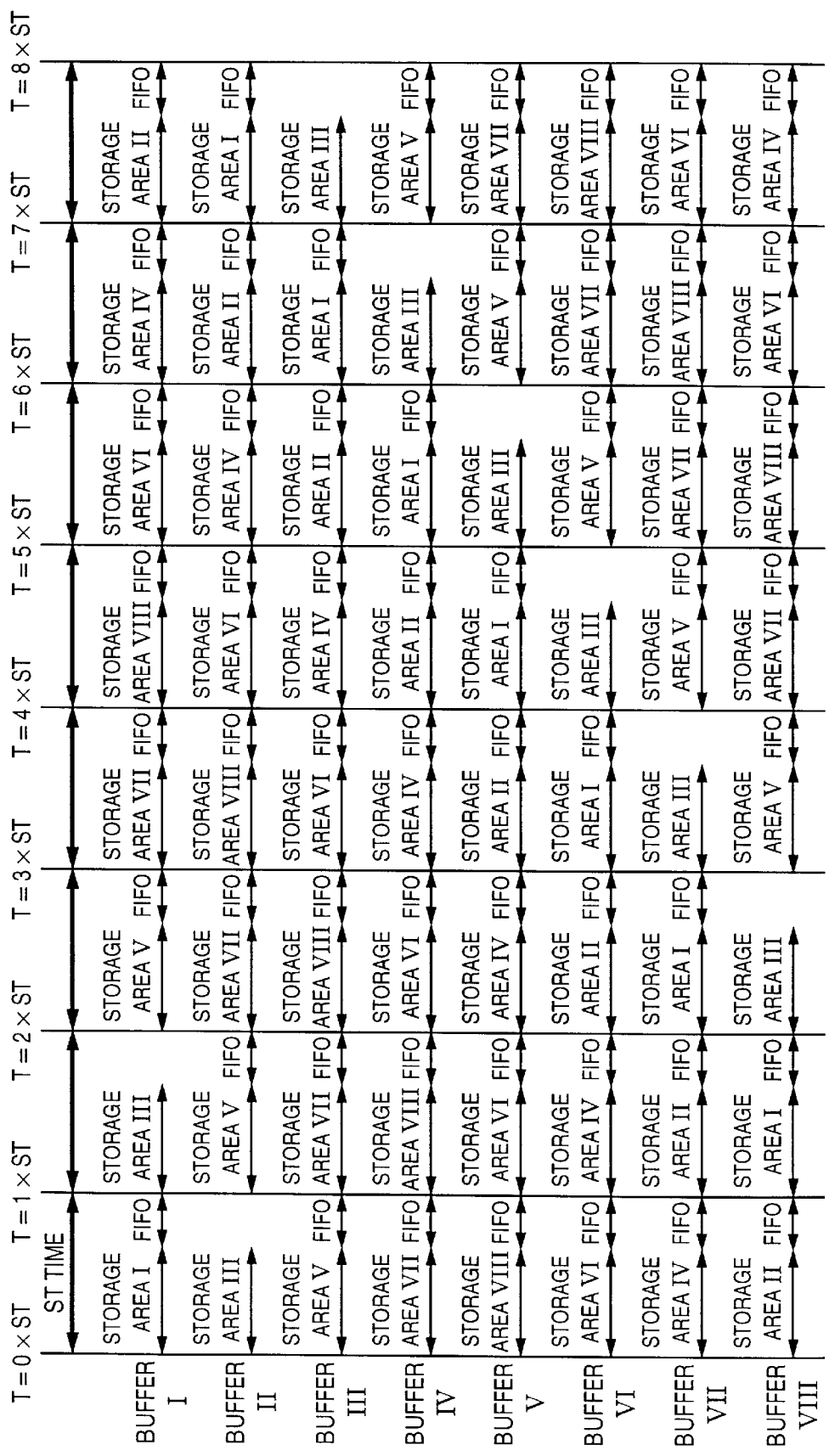
FIG. 7 is a timing chart concerning reading of packets according to the first embodiment of the present invention.

FIG. 7 is a timing chart pertaining to read of packets in the buffers I 129 to VIII 136.

Table 1 above shows the contents of wavelength control tables I to VIII, i.e., wavelength shifts of optical signals to be transmitted by the variable wavelength transmitters, as has been described in the reference example. Also, Table 2 above shows the offset values of buffer control tables I to VIII, as has been described in the reference example. The contents of the wavelength and buffer control tables I to VIII are synchronously read out by the ROM counter 502. With this control, the transmission wavelength of each tunable laser diode (TLD) cyclically shifts in the order of $\lambda 1, \lambda 3, \lambda 5,$ $\lambda 7, \lambda 8, \lambda 6, \lambda 4,$ and $\lambda 2,$ and the offset value for reading out the contents of the storage areas in the dual port memory in the buffer connected to each tunable laser diode (TLD) cyclically changes in the order of A1, A3, A5, A7, A8, A6, A4, and A2 in synchronism with the transmission wavelength shifts of the variable wavelength transmitter. Hence, according to the wavelength and buffer control tables, packets in the storage area corresponding to the transmission wavelength of each variable wavelength transmitter, which wavelength shifts cyclically, are converted into optical signals of the transmission wavelength of the variable wavelength transmitter, and are output. The transmission wavelengths of the variable wavelength transmitters I to VIII have different cyclic shift phases so as to prevent more than one variable wavelength transmitters from transmitting using an identical wavelength.

A control method of stopping the output of packets from the FIFOs after packets are read out from given storage areas in all the buffers will be described below with reference to FIGS. 1, 2, 3, 4, 5, 6, and 7, and Tables 1 and 2.

Assume that all the route controllers I 1601 to VIII 1608 output packets of equal transmission capacity to the connected buffers. As can also be understood from the reference example, this assumption can be explained as follows. A series of packets output from a certain transmitting terminal are stored in the FIFO 206 in the buffer on the channel connected to the transmitting terminal unless they are transmitted to the neighboring downstream node device. The packets stored in the FIFO 206 are output in the read time of the FIFO 206 in each ST unit time, and are converted into optical signals of the respective wavelengths by the variable wavelength transmitters. The packets converted into optical signals of different wavelengths are received by different fixed wavelength receivers, and are distributed onto the respective channels, as has been described in the reference example. With this control, packets output from a plurality of transmitting terminals are evenly distributed onto the channels on the network. Hence, the route controllers I 1601 to VIII 1608 output packets of nearly equal transmission capacities to the corresponding buffers.

In the following description of this embodiment, assume that the transmission capacity of packets to be output from each route controller to the connected buffer is 100 Mbps, and the maximum transmission capacity from the route controller to the buffer is 150 Mbps. In addition, node devices 100 according to the embodiment of the present invention are connected (601 to 605), as shown in FIG. 6.

The contents of this embodiment will be explained below while taking as an example the state wherein a transmitting terminal III 172 connected to anode device I 601 (see FIG. 6) outputs a packet having a transmission capacity of 100 Mbps to a receiving terminal I 170 connected to a node device III 603 (see FIG. 6).

In the node device of the reference example, the maximum transmission capacity that a certain transmitting terminal can output is the remainder obtained by subtracting the actual transmission capacity output from the separation/insertion unit connected to that transmitting terminal to the buffer from the maximum transmission capacity which can be output from the separation/insertion unit to the buffer. More specifically, assuming that the separation/insertion unit VIII 128 is outputting packets having a transmission capacity of 100 Mbps to the buffer VIII 136, the transmitting terminal VIII 177 connected to this separation/insertion unit VIII 128 can only output packets having a transmission capacity of 50 Mbps or less. However, as described earlier, the packet transmission capacities from the separation/ insertion units to the connected buffers in one node device are nearly equal to each other, and the free transmission capacity that can be output from each separation/insertion unit to the buffer is 50 Mbps. By summing up these free capacities for eight channels, the packet capacity that can be processed in one node device is 400 Mbps. For this reason, this embodiment is directed to effective use of such free transmission capacity.

The transmitting terminal III 172 encapsulates a 100-Mbps transmission start request in a packet, and outputs that packet to the packet processor 1600 of the node device I 601. This packet is received by the route controller III 1603 of the node device I 601 via a sub transmission path 162. The route controller III 1603 interprets the header of this packet, and outputs the packet to the packet processor 1600. The packet processor 1600 recognizes that the information in the received packet is a transmission request, and outputs the packet to the read controller 409 in the buffer controller 150. The read controller 409 interprets the transmission information of this packet, and checks if the node device I 601 can newly accept 100-Mbps transmission information. More specifically, the read controller 409 calculates the averages per unit time of the numbers of packets input to the dual port memories 205 and FIFOs 206 measured by the respective memory monitors 208, and detects that the total transmission capacity of packets input to the buffers is 100 Mbps. The read controller 409 accepts the transmission request when the following conditions are satisfied:

1) The transmission capacity from the transmitting terminal is equal to or smaller than the maximum transmission capacity per channel.

2) The free capacity of the channel connected to the transmitting terminal is equal to or smaller than the transmission capacity.

3) When condition 2) is not satisfied, a transmission band newly assured by distributing packets input to the channel connected to the transmitting terminal to other channels is equal to or smaller than the transmission capacity.

In this embodiment, since the transmission capacity of the transmitting terminal is 100 Mbps, condition 1) is satisfied. Also, by distributing packets (transmission rate=100 Mbps) on the channel connected to the transmitting terminal to other seven channels, the free band of the channel connected to the transmitting terminal is expanded to 150 Mbps, and condition 3) is satisfied. Therefore, the read controller 409 accepts this transmission request.

Subsequently, the read controller 409 notifies an upstream node device V 605 not to output packets to the buffer on the channel connected to the transmitting terminal III 172, i.e., to reduce the number of packets to be output to the fixed wavelength receiver III 107 connected to the route controller III 1603. Decreasing the number of packets to be output to the fixed wavelength receiver III 107 of the node device I 601 is to decrease the number of packets to be read out upon outputting an optical signal of the wavelength λ3 as the one and only channel that the fixed wavelength receiver III 107 can receive. However, in each ST unit time in which each variable wavelength transmitter of the node device V 605 outputs an optical signal of the wavelength λ3, packets stored in each storage area III that stores channel-designated packets in each buffer connected to the variable wavelength transmitter do not undergo this control, and are read out in the same manner as in the reference example. This is because a packet stored in a certain storage area does not have any influences on the transmission capacity of a packet from the route controller to the buffer since it is converted into an optical signal of the wavelength corresponding to that storage area and the optical signal is output onto the sub transmission path connected to the receiving terminal by a separation unit of the route controller in the neighboring node device before an insertion unit of that route controller inserts an incoming signal from the sub transmission path.

Therefore, the read controller 409 in the node device I 601 packages contents that request a reduction of the number of packets to be read out upon outputting an optical signal of the wavelength λ3 in a packet, also adds the address of the packet processor 1600 in the node device V 605 in its address field, and outputs that packet to the packet processor 1600 in the own node device. The packet processor 1600 outputs this packet to an arbitrary route controller. The packet is output to a neighboring node device II 602 via the variable wavelength transmitter. The packet output to the node device II 602 is input to the node device V 605 making its journey via the respective node devices according to the transmission method described in the reference example. The header portion of the packet input to the node device V 605 is interpreted by the route controller, and that packet is output to the packet processor 1600. Since the contents of this packet pertain to the output control of packets to the downstream node device, the packet processor 1600 outputs the packet to the read controller 409 in the buffer controller 150. Upon reception of this packet, the read controller 409 starts read control of packets from the FIFOs 206 upon outputting an optical signal of the wavelength λ3 to the node device I 601.

The read controller 409 in the node device V 605 then adds the address of the packet processor 1600 in the node device I 601 in the address field of a packet that contains a message indicating completion of preparation of the read control of packets from the FIFOs 206 upon outputting an optical signal of the wavelength λ3, and outputs that packet to the packet processor 1600. The packet processor 1600 outputs this part to an arbitrary route controller. The output packet is output to the neighboring node device I 601 by the variable wavelength transmitter via the route controller and buffer. The header portion of the packet input to the node device I 601 is interpreted by the route controller, and the packet is output to the packet processor 1600. The packet processor 1600 outputs this packet to the read controller 409 in the buffer controller 150 according to its contents pertaining to completion of preparation of the packet output control in the upstream node device V 605. Upon reception of this packet, the read controller 409 recognizes the start of the read control of packets from the FIFOs 206 in the node device V 605 upon outputting an optical signal of the wavelength λ3. The read controller 409 then outputs a packet that grants the transmitting terminal III 172 the start of transmission to the packet processor 1600. Upon reception of this packet, the terminal III 172 recognizes the grant, and outputs a packet having a transmission capacity of 100 Mbps.

The read control of packets from the FIFOs 206 upon outputting an optical signal of the wavelength λ3 by the read controller 409 in the node device V 605 will be explained below with reference to FIG. 7.

The ROM counter 502 in the wavelength controller 151 counts the clock signal generated by the clock generator 501 to simultaneously output a read address value to the wavelength and buffer control tables I to VIII at ST unit time intervals. In response to this address value, the contents of the wavelength and buffer control tables are respectively output to the variable wavelength transmitters and buffers.

Assume that the ROM counter 502 outputs a read address value "0" to the wavelength and buffer control tables and the read controller 409 at T=0 (see FIG. 7). As shown in Table 1 above, the contents read out from the wavelength control tables at that time are as follows. That is, the wavelength control table I outputs a control signal corresponding to the wavelength λ1, and likewise, the wavelength control tables II, III, VI, V, VI, VII, and VIII respectively output control signals corresponding to the wavelengths λ3, λ5, λ7, λ8, λ6, λ4, and λ2. These control signals are input to the variable wavelength transmitters connected to the wavelength control tables. The variable wavelength transmitters output optical signals of predetermined wavelengths corresponding to these control signals.

As for the contents read out from the buffer control tables in response to the read address value "0" from the ROM counter 502, as shown in Table 2 above, the buffer control table I outputs an offset value A1 corresponding to the storage area I, and similarly, the buffer control tables II, III, IV, V, VI, VII, and VIII respectively output offset values A3, A5, A7, A8, A6, A4, and A2 corresponding to the storage areas III, V, VII, VIII, VI, IV, and II. These offset values are output to read address counters 203 in the buffers I to VIII, thus setting the buffers to be ready to read out packets from the storage areas corresponding to the identifiers.

The read controller 409 performs control for stopping the read of packets for the FIFO read time of the buffer II 130 during the ST unit time from T=0. Note that packets are read out from the FIFOs of the buffers I 129, III 131, IV 132, V 133, VI 134, VII 135, and VIII 136 in the ST unit time from T=0, as has been described in the reference example. This is because this read control is done for the purpose of increasing the free transmission capacity in the route between the route controller III 1603 and buffer III 131 in the node device I 601, but not for packets transmitted from other route controllers to the buffers.

Hence, during the ST unit time from T=0 the read controller 409 in the node device V 605 stops only the read of packets from the FIFO 206 after packets are read out from the storage area III in the dual port memory 205 of the buffer II 130, but normally reads out packets from the FIFOs 206 in the buffers other than the buffer II 130 according to the control method described in the reference example. More specifically, the read controller 409 recognizes the ST unit time interval (ST unit time from T=0) upon change in read address value from the ROM 502, and outputs a read grant control signal of the dual port memory 205 and a read denial control signal of the FIFO 206 to the selector 1501 while packets remain stored in the storage area III in the dual port memory 205 of the buffer II 130. Upon reception of the read grant control signal of the dual port memory 205 and the read denial control signal of the FIFO 206, the selector 1501 connects the output terminal of the dual port memory 205 to the variable wavelength transmitter II 114, and supplies a packet output grant control signal to the read address counter 203 connected to the dual port memory 205. With this control, the read address counter 203 in the buffer II 130 loads the input offset value A3, sequentially increments the loaded value in accordance with the packet output grant signal from the selector 1501, and outputs the incremented values to the dual port memory 205. A packet in the storage area III in the dual port memory 205 is read out every time the loaded value (offset value A3) is incremented and is converted into an optical signal of the wavelength λ3 by the variable wavelength transmitter II 114, and the optical signal is output to the neighboring node device I 601.

After the read controller 409 confirms based on the memory monitor 208 that all the packets in the storage area III in the buffer II 130 have been output, it outputs read denial control signals of the dual port memory 205 and FIFO 206 to the selector 1501 so as to inhibit packets in the FIFO 206 of the buffer II 130 from being converted into an optical signal of the wavelength λ3. During this control, no packets in the FIFO 206 converted into optical signals of the wavelength λ3 are output, and the transmittable capacity of this channel is expanded to 150 Mbps. Hence, the transmitting terminal III 172 can start transmission. Note that when T=ST unit time, the read controller 409 cancels the read denial control signals of the dual port memory 205 and FIFO 206 of the buffer II 130, and performs the buffer read control described in the reference example for the buffer II 130. That is, the read controller 409 reads out packets from the storage area V and FIFO 206 of the buffer II 130.

During the interval from T=ST unit time to 2×ST unit time, the buffer in which a read from the FIFO 206 is denied after a read from the dual port memory 205 is switched to the buffer I. This is because the transmitter that outputs an optical signal of the wavelength λ3 during the interval from T=ST unit time to 2×ST unit time is the variable wavelength transmitter I 113, and the buffer connected to this variable wavelength transmitter I 113 is the buffer I 129. For this reason, after the read controller 409 reads out packets in the storage area III in the buffer I 129, it outputs read denial control signals of the dual port memory 205 and FIFO 206 to the selector 1501 to inhibit packets in the FIFO 206 of the buffer I 129 from being converted into an optical signal of the wavelength λ3. With this control, no packets are output from the route controller III 1603 to the buffer III 131 in the node device I 1601 during the interval from T=ST unit time to 2×ST unit time, and this channel can be freely used.

A series of control operations for denying a read from the FIFO 206 after a read from a predetermined storage area are done for the buffer VIII 136 during the interval from T=2×ST to 3×ST unit time, the buffer VII 135 during the time interval from T=3×ST to 4×ST unit time, the buffer VI 134 from the interval from T=4×ST to 5×ST unit time, the buffer V 133 during the interval from T=5×ST to 6×ST unit time, the buffer IV 132 during the interval from T=6×ST to 7×ST unit time, and the buffer III 131 during the interval from T=7×ST to 8×ST unit time. In this way, no packets are output from the route controller III 1603 to the buffer III 131 in the node device I 601 during these intervals, and the transmitting terminal III 172 connected to the node device I 601 can output a packet having a transmission capacity of 100 Mbps.

The control after the transmitting terminal III 172 connected to the node device I 601 has output the packet having a transmission capacity of 100 Mbps will be explained below.

The transmitting terminal III 172 packages the address of the packet processor 1600 of the node device V 605 in the header of a packet that indicates completion of transmission of the 100-Mbps packet, and outputs that packet to the node device I 601. The packet is received by the route controller III 1603 in the node device I 601 via the sub transmission path 162. The route controller III 1603 interprets the header of this packet, and outputs the packet to the buffer III 131. The packet readout from the buffer III 131 is output to the neighboring node device II 602 by the variable wavelength transmitter III 115. The packet output to the node device II 602 is input to the node device V 605 hopping through the respective node devices according to the transmission method described in the reference example. The header of the packet input to the node device V 605 is interpreted by the route controller, and that packet is output to the packet processor 1600. The packet output from the packet processor 1600 is input to the read controller 409, which recognizes based on the information in the packet that the transmitting terminal III 172 has output the packet having a transmission capacity of 100 Mbps, cancels read denial from the FIFOs 206 after the read from the storage areas III at ST time intervals, and restores normal read control.

As described above, when the node device of this embodiment is used, each terminal can output information exceeding the free transmission capacity from the connected route controller to the buffer. More specifically, the upstream node device outputs packets to be output to the fixed wavelength receivers connected to other route controllers so as not to output packets from a certain route controller to the connected buffer in the downstream node device, thus increasing the free transmission capacity from the predetermined route controller to the buffer, and the transmitting terminal connected to the predetermined route controller can use the free transmission capacity.

In this embodiment, the read controller 409 in the node device connected with the transmitting terminal sets the buffer read control. However, the present invention is not limited to such specific control. For example, the read controller 409 in the node device (i.e., the upstream node device) that outputs packets to the node device connected with the transmitting terminal may perform this setup. Also, upon read denial control of packets from the FIFOs 206 after a read from predetermined storage areas, communications between the transmitting terminal and the read controller 409 in the node device connected with that terminal, communications between the read controller 409 in the node device connected with the transmitting terminal, and the read controller 409 in the upstream node device located upstream that node device, and communications between the read controller 409 in the upstream node device and the transmitting terminal are not limited to those described in this embodiment. More specifically, communication methods other than that described in this embodiment can be used as long as the read controller 409 in the node device located upstream the node device connected with the transmitting terminal can recognize necessity of stopping packet outputs from a predetermined route controller to the connected buffer in the downstream node device, and that transmitting terminal can detect the start of read denial control of packets from the FIFOs 206 in the upstream node device.

[Second Embodiment]

This embodiment is directed to a control method that does not deny all read accesses from the FIFOs 206 after the read from predetermined storage areas in the dual port memories 205, but allows control for reading out packets from the FIFOs 206 and stopping the read as needed. The physical arrangement of the node device of this embodiment is the same as that in the first embodiment.

Figure 8:
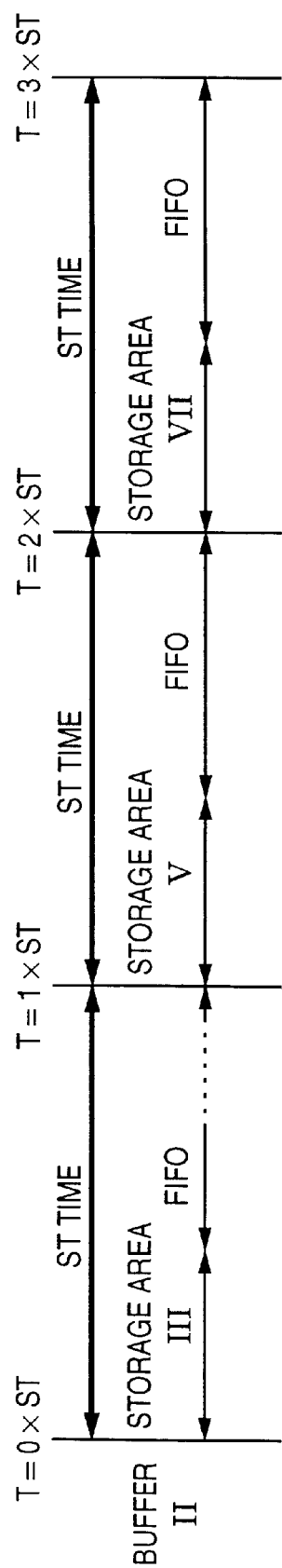
FIG. 8 is a timing chart concerning reading of packets according to the second embodiment of the present invention.

A detailed explanation will be given below using FIG. 8.

Assume that the node device V 605 outputs packets having a total transmission capacity of 1,080 Mbps to the node device I 601, and none of the packets are addressed to the terminals connected to the node device I 601. In this embodiment as well, since packets to be transmitted to other node devices via the downstream neighboring node device are stored in the FIFOs 206 that receive non-channel-designated packets, without designating channels, all these packets are output from any one of the route controllers in the node device I 601 to the buffer, and the average transmission capacity from the route controller to the buffer becomes 135 Mbps. Assume that the transmitting terminal III 172 connected to the node device I 601 (see FIG. 6) outputs a packet having a transmission capacity of 40 Mbps to the receiving terminal I 170 connected to the node device III 603 (see FIG. 6) under such traffic characteristics.

In this case, since the maximum transmission rate from the route controller to the buffer is 150 Mbps and the effective output rate from the route controller to the buffer is 135 Mbps, the transmitting terminal III 172 cannot output a packet having a transmission capacity of 40 Mbps to the receiving terminal I 170 connected to the node device III 603 (see FIG. 6).

In such situation, it is impossible to apply the control method of the first embodiment. This is because the effective capacity of packets output from the variable transmission unit in the node device V 605 upstream the node device I 601 connected with the transmitting terminal III 172 exceeds 150 Mbps if the control method of the first embodiment is applied.

To solve this problem, this embodiment uses a control sequence that allows to read out a packet from the connected FIFO 206 and to convert it into an optical signal of a predetermined wavelength even while the variable wavelength transmitter is outputting light of the predetermined wavelength.

However, communications between the transmitting terminal and the read controller 409 in the node device connected with that terminal, communications between the read controller 409 in the node device connected with the transmitting terminal, and the read controller 409 in the upstream node device located upstream that node device, and communications between the read controller 409 in the upstream node device and the transmitting terminal, which are required upon executing the control pertaining to the read of packets from the predetermined storage areas and FIFOs 206 in respective ST unit times, are made by the method described in the first embodiment.

The read controller 409 of the node device I 601 sets how to read out packets from the buffers. As mentioned previously, packets are being read out from the FIFOs 206 of the respective buffers in the node device V 605 at an average rate of 135 Mbps. If the control is made to inhibit packets from being read out from the FIFO 206 of the buffer connected to the variable wavelength transmitter which outputs an optical signal of a predetermined wavelength, packets must be read out from the FIFOs 206 of other buffers at a rate of 150 Mbps or more. The read controller 409 of the node device I 601 sets the read of packets from the respective FIFOs 206 in the node device V 605 as follows (all the packets stored in the node device V 605 are stored in the FIFOs 206 under the above-mentioned assumption. This is because none of the packets output from the node device V 605 are addressed to terminals connected to the node device 1601).

When light of the wavelength other than λ3 is output, packets are read out from the FIFOs 206 at a rate of 140 Mbps; when light of the wavelength λ3 is output, packets are read out from the FIFOs 206 at a rate of 100 Mbps. With such setups, packets are read out from the respective buffers at a rate of 135 [∵(100×1+140×7)÷8] Mbps while preventing packets from staying in the buffers of the node device V 605. Also, packets are input to the fixed wavelength receivers other than the fixed wavelength receiver III of the node device I 601 at a rate of 140 Mbps, and packets are input to the fixed wavelength receiver III at a rate of 100 Mbps. Hence, the transmitting terminal III 172 connected to the node device I 601 (see FIG. 6) can output a packet having a transmission capacity of 40 Mbps to the receiving terminal I 170 connected to the node device III 603 (see FIG. 6).

The read controller 409 in the node device I 601 writes the setup value in a packet, and sends that packet to the read controller 409 in the node device V 605.

Note that the packet read rates to be set by the read controller may have various combinations, and are not limited to the above-mentioned combination. That is, the read controller 409 determines the read rate from the buffers so as to assure a band corresponding to the output rate of the transmitting terminal connected to the downstream node device.

The control sequence of the read controller 409 in the node device V 605 will be explained below with the aid of FIG. 8. Note that transmission information is transferred using ATM cells (:53×8[bits]), and the ST unit time is set to be $2.26133 \times 10^{-5}$ (sec) (:[53×8×8÷150×10$^6$]) required for processing eight ATM cells using a channel having a transmission capacity of 150 Mbps.

Assume that the ROM counter 502 outputs a read address value "0" to the wavelength and buffer control tables and the read controller 409 at T=0 (see FIG. 9). As shown in Table 1 above, the contents read out from the wavelength control tables at that time are as follows. That is, the wavelength control table I outputs a control signal corresponding to the wavelength λ1, and likewise, the wavelength control tables II, III, VI, V, VI, VII, and VIII respectively output control signals corresponding to the wavelengths λ3, λ5, λ7, λ8, λ6, λ4, and λ2. These control signals are input to the variable wavelength transmitters connected to the wavelength control tables. The variable wavelength transmitters output optical signals of predetermined wavelengths corresponding to these control signals.

As for the contents read out from the buffer control tables in response to the read address value "0" from the ROM counter 502, as shown in Table 2 above, the buffer control table I outputs an offset value A1 corresponding to the storage area I, and similarly, the buffer control tables II, III, IV, V, VI, VII, and VIII respectively output offset values A3, A5, A7, A8, A6, A4, and A2 corresponding to the storage areas III, V, VII, VIII, VI, IV, and II. These offset values are output to the read address counters 203 in the buffers I to VIII, and indicate the start addresses of the storage areas to be read out from the dual port memories 205 of the respective buffers.

During an ST unit time from T=0, the read controller 409 outputs a read denial control signal of the dual port memory 205 and a read grant control signal of the FIFO 206 to the selector 1501 in the buffer II 130. The reason why a read grant control signal of the dual port memory 205 and a read denial control signal of the FIFO 206 are not output is that none of the packets to be output from the node device V 605 are addressed to the terminals connected to the node device I 601, and no packets are stored in the dual port memories 205, as described above. Upon receiving the read denial control signal of the dual port memory 205 and read grant control signal of the FIFO 206, the selector 1501 connects the output terminal of the FIFO 206 to the variable wavelength transmitter II 114, and supplies a packet output grant control signal to the FIFO 206. With this control, packets are read out from the FIFO 206 of the buffer II 130 and are converted into optical signals of the wavelength λ3 by the variable wavelength transmitter II 114, and the optical signals are output to the neighboring node device I 601. After the read controller 409 has read out 5.333 . . . [: 100M×ST÷(53×8)] from the FIFO 206 of the buffer II 130 during the ST unit time from T=0, it outputs a read denial control signal of the dual port memory 205 and a read grant control signal of the FIFO 206 to the selector 1501. In this way, during the ST unit time from T=0, packets are read out from the FIFO 206 of the buffer II 130 at a rate of 100 Mbps. The number of packets read out from the FIFO 206 is detected in such a manner that the memory monitor 208 of each buffer reads out a recognition signal for each packet output, and outputs it to the read controller 409.

Note that the read controller 409 in this embodiment reads out packets to attain a rate of 100 Mbps during the ST unit time, but may make control to attain 100 Mbps in one second. That is, the present invention is not limited to such specific rate. More specifically, the read controller 409 may read out 235849.05 [: 100M÷(53×8)] packets in one second.

Note that the read controller 409 outputs a read denial control signal of the dual port memory 205 and a read grant control signal of the FIFO 206 to the selectors 1501 so as to read out 7.4666 [140M×ST÷(53×8)] packets from the FIFO 206 of each of the buffers other than the buffer II 130 during the ST unit time from T=0.

During the interval from T=ST unit time to 2×ST unit time, the read controller 409 outputs a read denial control signal of the dual port memory 205 and a read grant control signal of the FIFO 206 to the selectors 1501 so as to read out 7 [140M×ST÷(53×8)] packets from the FIFO 206 of each of the buffers other than the buffer I 129 and to read out 5 [100M÷(53×8)] packets from the FIFO 206 of the buffer I 129.

With a series of read control operations of the FIFOs 206, the transmission capacity of packets to be output from the route controller III 603 to the buffer in the node device I 601 becomes 100 Mbps, and the transmitting terminal III 172 can output a packet having a transmission capacity of 40 Mbps.

Note that the number of packets to be read out from the FIFO after packets are read out from a certain storage area may differ in units of buffers. This is because identical numbers of packets are not always stored in the FIFOs of the respective buffers. In such case, packets may be read out from the FIFO that stores many packets.

As described above, when the node device of this embodiment is used, the node device upstream the node device connected with the transmitting terminal that starts new transmission limits packet outputs so as to assure a transmission band required for that terminal.

[Third Embodiment]

The embodiments described above use the variable wavelength transmitters as a channel change unit for performing channel selection. With this arrangement, the need for switches for channel selection can be obviated, and the arrangement can be simplified. However, the present invention is not limited to such specific arrangement, and may be applied to an arrangement using switches.

In the arrangement using the variable wavelength transmitters, the transmission wavelengths of the wavelength transmitters are changed in turn at ST unit time intervals. In the above embodiments, serial numbers are assigned in ascending (descending) order of wavelengths like λ1, λ2, . . . , λ7, and a channel change pattern in the order of λ1, λ3, λ5, λ7, λ6, λ4, λ2, and λ1 is used: after the first wavelength is selected, odd-numbered wavelengths are selected in turn in ascending order, after the largest odd-numbered wavelength is selected, the largest even-numbered wavelength is selected and then even-numbered wavelengths are selected in turn in descending order, and finally, the first wavelength is selected again. With this pattern, the wavelength change amount upon wavelength shift can be minimized, and the respective variable wavelength transmitters can use an identical wavelength shift pattern (alternatively, the following pattern may be used: after the second wavelength is selected, even-numbered wavelengths are selected in turn in ascending order, after the largest even-numbered wavelength is selected, the largest odd-numbered wavelength may be selected and then odd-numbered wavelengths may be selected in turn in descending order, and finally, the second wavelength is selected again).

Even with the above-mentioned means, the stabilization time for the wavelength after wavelength shift is required depending on the characteristics of the variable wavelength transmitter used in the above embodiment, e.g., a variable wavelength semiconductor laser having a distributed feedback or distributed reflection type structure.

In the embodiment to be described below, a channel change unit uses a switch arrangement to solve a problem arising from the wavelength shift. In the embodiment to be described below, a predetermined pattern is used upon switching the connection between the input and output channels, and from a buffer corresponding to each input channel, packets to be output to the output channel connected upon connecting that buffer to the output channel via the channel change unit are read out, thus realizing an arrangement that can obviate the need for arbitration control.

Figure 12:
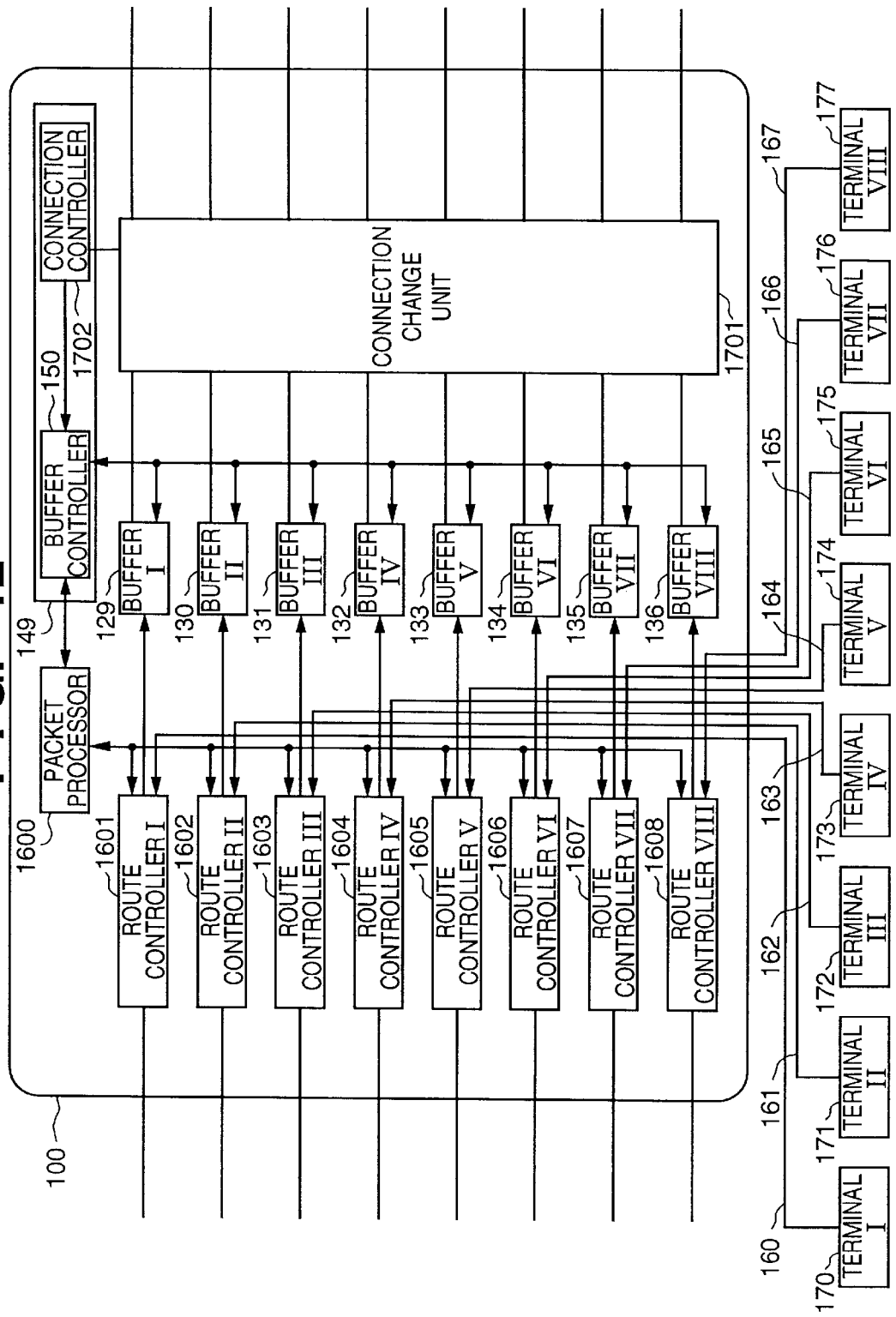
FIG. 12 is a block diagram showing the arrangement of a node device according to the third embodiment of the present invention.

FIG. 12 shows the arrangement of a node device used in this embodiment. As compared to the arrangement of the node device used in the first embodiment which uses the variable wavelength transmitters as a channel change unit, a connection change unit 1701 is used as the channel change unit in this embodiment. Since this embodiment executes channel selection using the connection change unit 1701, the wavelength controller used in the first embodiment is replaced by a connection controller 1702 accordingly. The connection change unit 1701 has a function equivalent to the variable wavelength transmitters arranged in correspondence with the input channels in the first embodiment, although its arrangement will be described later, and also, the connection controller 1701 has a function equivalent to that of the wavelength controller in the first embodiment. This embodiment does not use optical communications and, hence, has no fixed wavelength transmitters used for converting a signal into an optical signal after channel selection.

Figure 13:
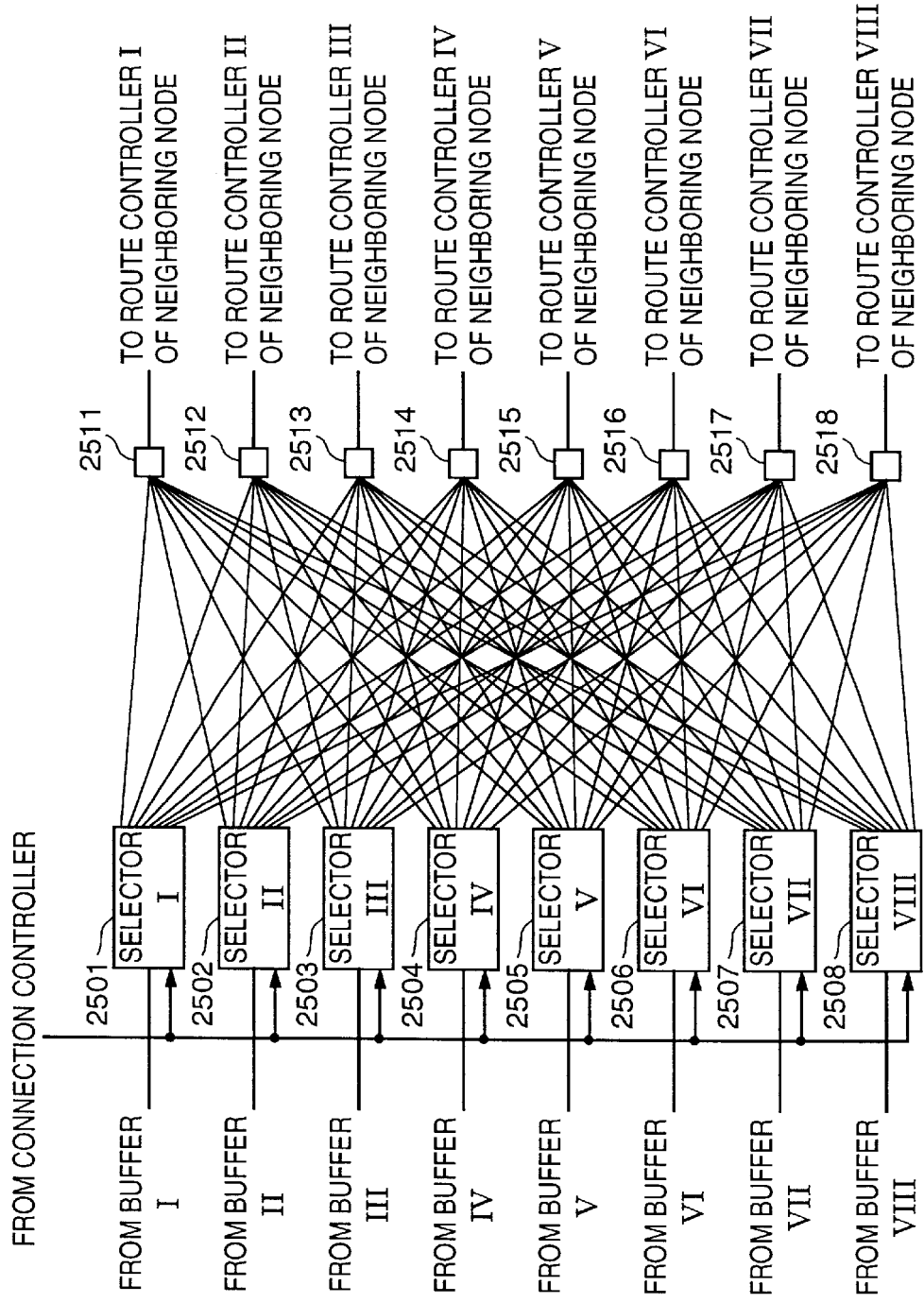
FIG. 13 is a block diagram showing the arrangement of a connection change unit according to the third embodiment of the present invention.

FIG. 13 shows the arrangement of the connection change unit. Reference numerals 2501 to 2508 denote selectors I to VIII, each of which selects one of output terminals 2511 to 2518 under the control of the connection controller 1702, and which sequentially connect the buffers I to VIII to the output channels in a predetermined pattern.

Note that the predetermined pattern used in this embodiment connects the selectors I to VIII and output terminals 2511 to 2518 in a given pattern to prevent more than one selectors from being connected to one output terminal upon connecting them.

Figure 14:
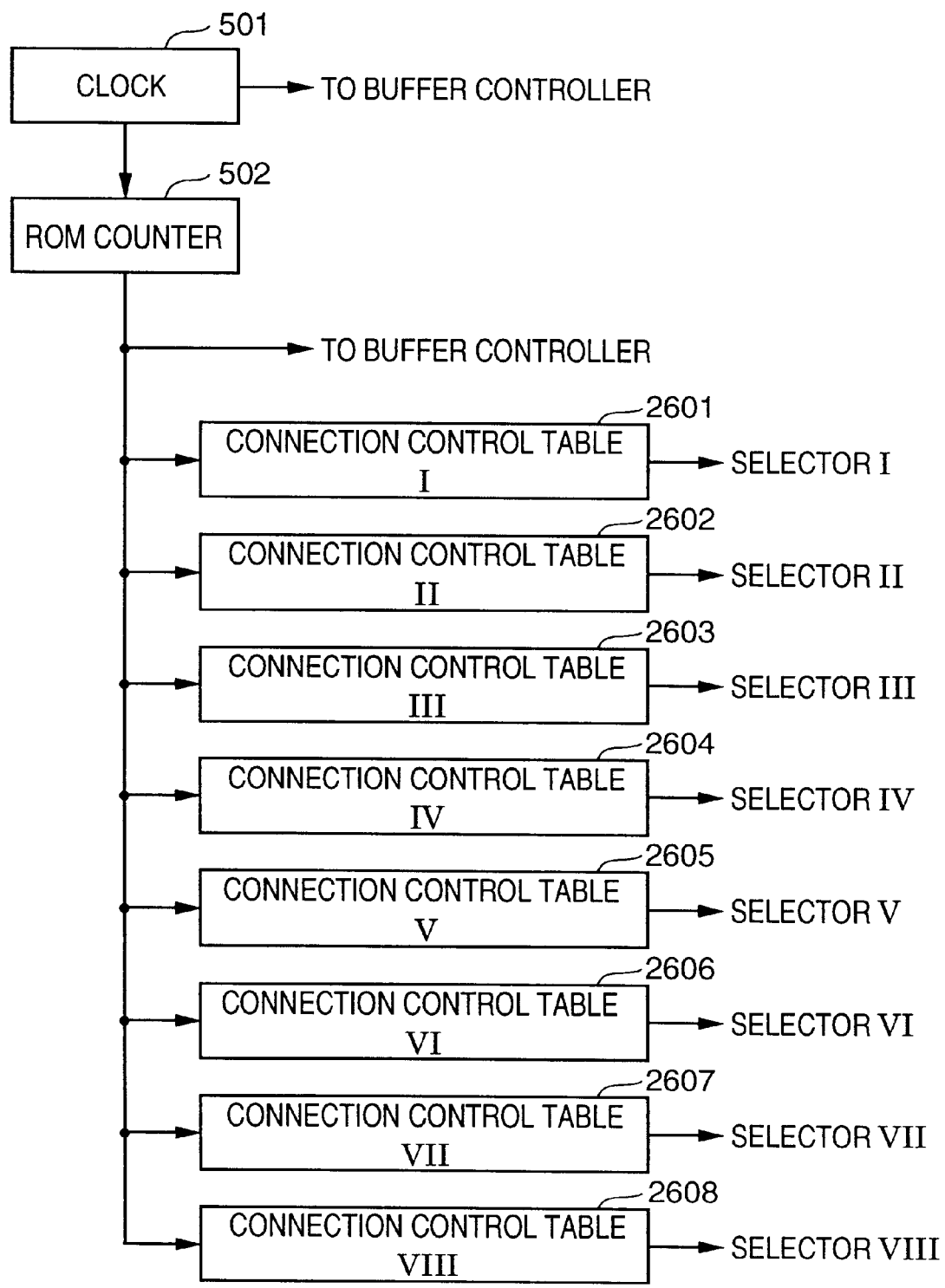
FIG. 14 is a block diagram showing the arrangement of a connection controller according to the third embodiment of the present invention.

FIG. 14 shows the arrangement of the connection controller 1702. The wavelength control tables 1503 to VIII 510 of the wavelength controller used in the first embodiment are replaced by connection control tables I 2601 to VIII 2608. The outputs from these tables are input to the corresponding selectors of the connection change unit 1701. In FIG. 12, a signal from the connection controller 1702 is input to the connection change unit 1701 via a single line, and is distributed to the respective selectors. However, this arrangement can be appropriately set as long as signals from the respective tables are input to the corresponding selectors (the connection control tables I, II, III, IV, V, VI, VII, and VIII respectively correspond to the selectors I, II, III, IV, V, VI, VII, and VIII). The contents of the tables are not particularly limited as long as they have a pattern that can prevent more than one inputs from being connected to one output terminal. A large number of such patterns can be formed. Especially, since the arrangement using the selectors as in this embodiment need not consider any pattern that can minimize the wavelength shift amount, which is desirably considered in the first embodiment and the like, a pattern can be freely set. However, for the sake of simplicity, this embodiment also uses a pattern complying with that used in the first and second embodiments. Table 3 below shows the contents of the respective tables. Numerals in Table 3 below correspond to Roman numerals of the output terminals I to VIII connected. Also, since tables similar to the wavelength control tables used in the first and second embodiments are used as the connection control tables, the same buffer control tables as those used in the first and second embodiments are used.

TABLE 3

| Table Name | Address | | | | | | | |
|---|---|---|---|---|---|---|---|---|
| | 0 | 1 | 2 | 3 | 4 | 5 | 6 | 7 |
| Connection Control Table I | 1 | 3 | 5 | 7 | 8 | 6 | 4 | 2 |
| Connection Control Table II | 3 | 5 | 7 | 8 | 6 | 4 | 2 | 1 |
| Connection Control Table III | 5 | 7 | 8 | 6 | 4 | 2 | 1 | 3 |
| Connection Control Table IV | 7 | 8 | 6 | 4 | 2 | 1 | 3 | 5 |
| Connection Control Table V | 8 | 6 | 4 | 2 | 1 | 3 | 5 | 7 |
| Connection Control Table VI | 6 | 4 | 2 | 1 | 3 | 5 | 7 | 8 |
| Connection Control Table VII | 4 | 2 | 1 | 3 | 5 | 7 | 8 | 6 |
| Connection Control Table VIII | 2 | 1 | 3 | 5 | 7 | 8 | 6 | 4 |

In this embodiment, the output terminals to be selected by the selectors of the connection change unit are sequentially changed in accordance with the connection control tables, and the respective buffers output packets to be transmitted from the connection channels synchronous with the change of the output terminals to be selected by the selectors that receive signals from the buffers.

Control other than the above-mentioned connection change unit is the same as that in the first and second embodiments.

Figure 16:
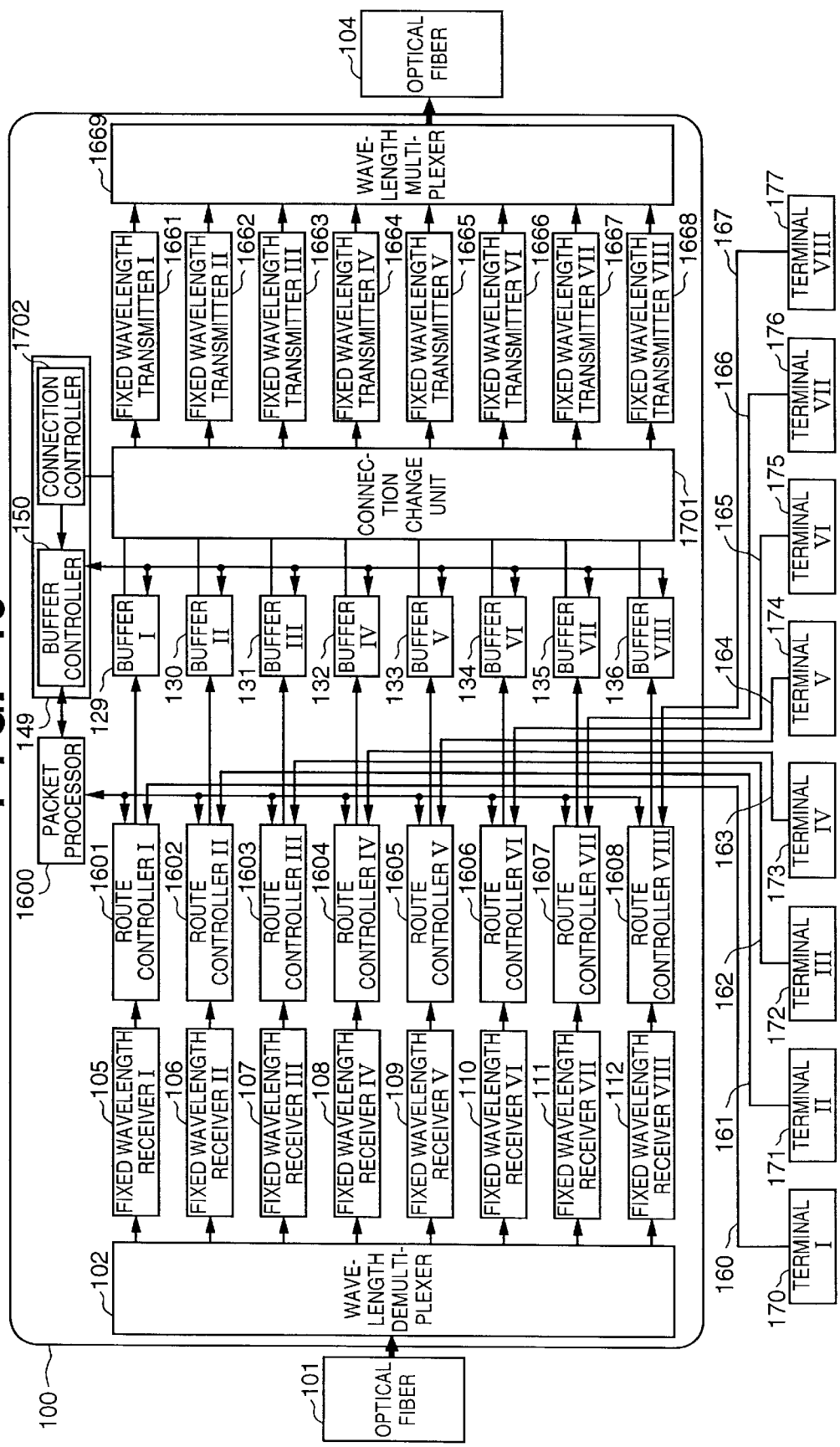
FIG. 16 is a block diagram showing the arrangement of a node device according to an example of the embodiment of the present invention.
Figure 17:
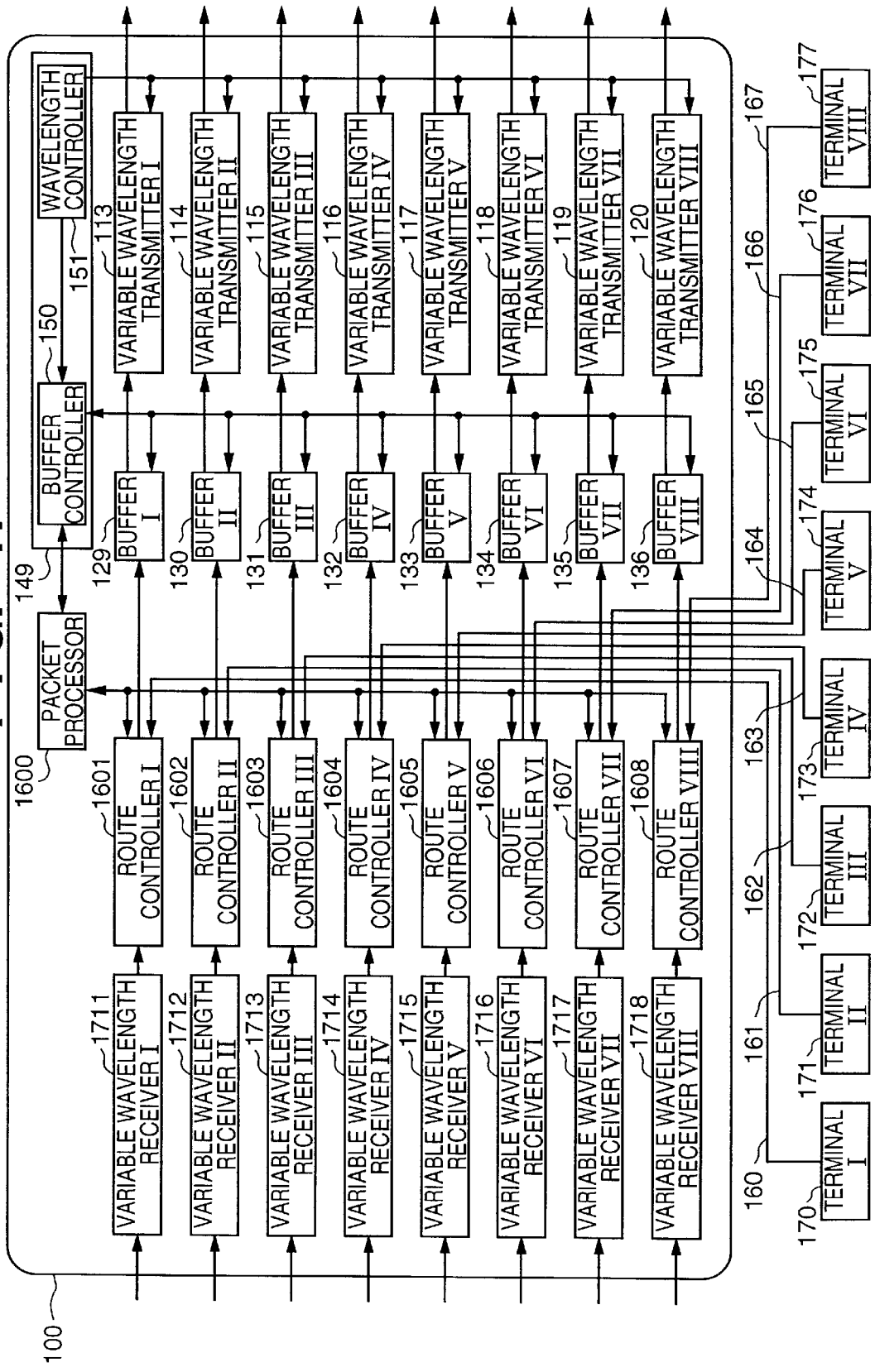
FIG. 17 is a block diagram showing the arrangement of a node device according to another example of the embodiment of the present invention.
Figure 18:
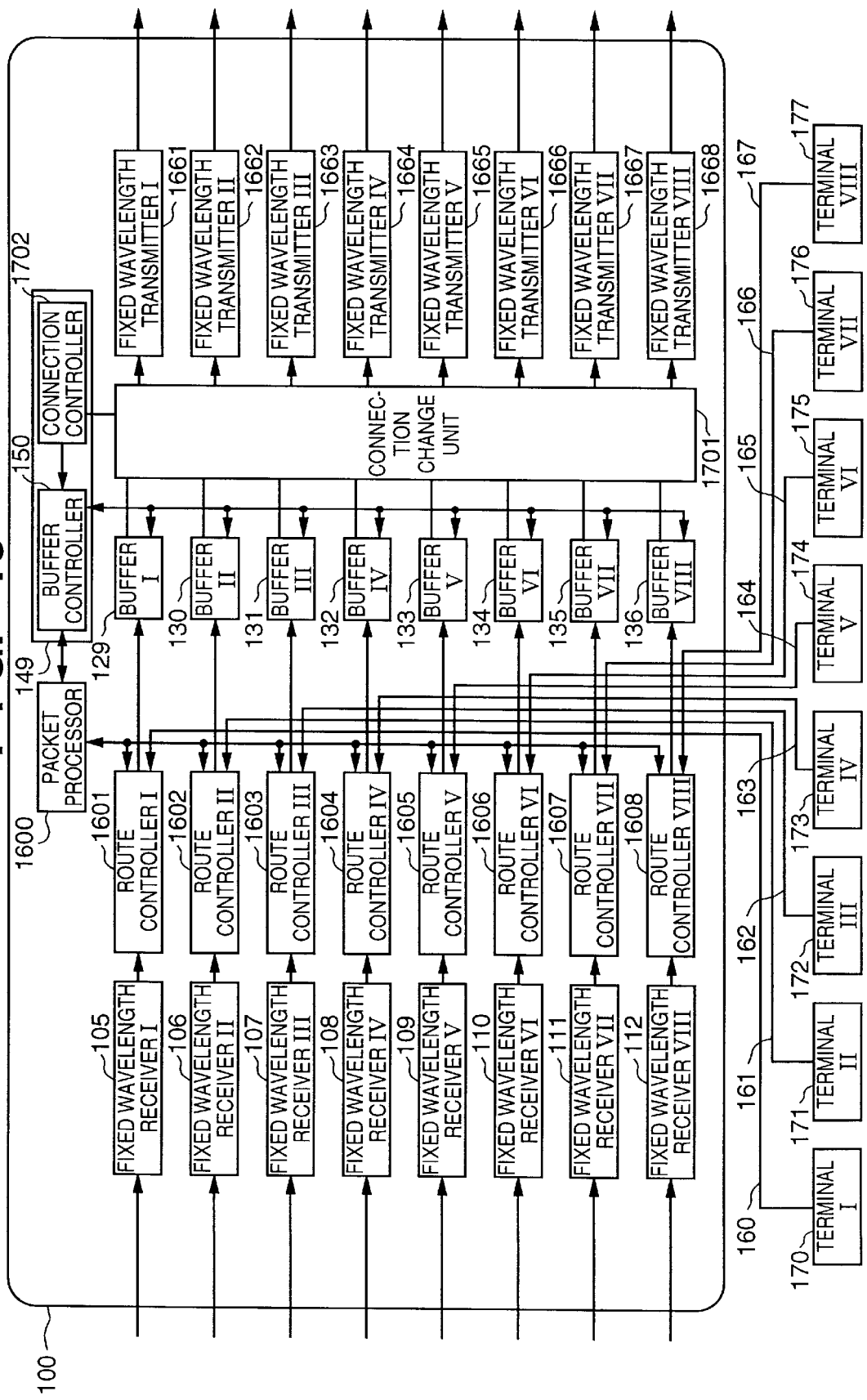
FIG. 18 is a block diagram showing the arrangement of a node device according to still another example of the embodiment of the present invention.

When optical communications are used between neighboring node devices in this embodiment, fixed wavelength transmitters 1661 to 1668 having different wavelengths maybe arranged in correspondence with the output terminals of the connection change unit 1701, and a wavelength multiplexer 1669 may multiplex the outputs from these transmitters to attain wavelength multiplex transmission, as shown in FIG. 16. In this case, a wavelength demultiplexer 102 and fixed wavelength receivers 105 to 112 that extract signals of desired wavelengths (channels) may be inserted on the input stage of the route controllers. Alternatively, a signal input to the node device may be demultiplexed by a wavelength demultiplexer in units of wavelengths, the demultiplexed signals may be O/E-converted, and converted signals may be input to the route controllers. In the above embodiments, different wavelengths are multiplexed, and a multiplexed signal is optically transmitted to the node device via a single optical fiber so as to attain optical transmission. Alternatively, different transmission paths may be used, as shown in FIGS. 17 and 18. Furthermore, in case of FIG. 18, the transmitters need not have different wavelengths. In this case, neither the wavelength multiplexer nor wavelength demultiplexer are needed, and the wavelength to be received need not be extracted while being distinguished from other wavelengths. Moreover, especially, in order to allow easy layout of a plurality of transmission paths between neighboring node devices, a ribbon fiber that bundles a plurality of optical fibers is preferably used.

When the node device shown in FIG. 17 is used, an identical pattern may be synchronously used for switching the transmission wavelengths of the variable wavelength transmitters I to VIII and for switching the reception wavelengths of variable wavelength receivers I to VIII.

Even when transmission is done between given node devices using electrical signals, as shown in FIG. 12, if the signal format to be processed inside the node device is different from the signal format used in transmission-between the node devices, the signal format may be converted using a driver.

[Fourth Embodiment]

This embodiment uses the node device of the present invention as a means for avoiding influences of broadcast communications on other communications.

Assume that the node device in this embodiment has a physical arrangement shown in FIG. 19, and the network architecture is the same as that in the first embodiment. The arrangement of this embodiment realizes the arrangement described in the third embodiment using optical transmission between given node devices.

Unlike in the above embodiments, the decoder 201 in the buffer shown in FIG. 2 has the following function. That is, when a packet contains broadcast data, and the node number of the transmitting terminal matches the own node number, the decoder connects the output terminal of the demultiplexer to the dual port memory 205, and designates all the storage areas I to VIII in the write address counter 202; when the node number of the transmitting terminal does not match the own node number, the decoder connects the output terminal of the demultiplexer to the dual port memory 205, and sets the write address, as shown in Table 4 later. Also, each of the route controllers I 1601 to VIII 1608 has the following function. That is, when a packet sent from the upstream node device contains broadcast data, and when the node number of the transmitting terminal does not match the own node number, the route controller outputs that packet to both the buffer and sub transmission path; when the node number of the transmitting terminal matches the own node number, the route controller outputs the packet to only the sub transmission path.

Broadcast communications in the network shown in FIG. 6 will be explained first. A case will be explained below wherein the transmitting terminal I 170 connected to the node device I 601 transmits data to all the terminals connected to the network.

The transmitting terminal I 170 connected to the node device I 601 forms a packet having an address field which declares that it contains data to be broadcasted, and includes the position information of the transmitting terminal, and inputs that packet to the route controller I 1601 of the node device I 601 via the sub transmission path 160. The route controller I 1601 inserts that packet into a break point of the packet flow from the transmission path, and sends it to the buffer I 129. The decoder 201 of the buffer I 129 reads the address field of the input packet. Since this packet contains data to be broadcasted, and the node number of the transmitting terminal matches the own node number, the decoder 201 connects the output terminal of the demultiplexer 204 to the dual port memory 205, and designates all the storage areas I to VIII in the write address counter 202. Upon reception of such information, the write address counter 202 generates write addresses, and the packet is simultaneously written in all the storage areas I to VIII in the dual port memory 205.

The eight copied packets written in the storage areas I to VIII in the dual port memory 205 are respectively distributed to eight channels in the connection change unit 1701, and are converted into optical signals by an electro-optical (E/O) conversion unit 1801. After the conversion, the optical signals are input to the node device II 602 via the optical fiber transmission path. The packets input to the node device II 602 are respectively converted into electrical signals by an opto-electric (O/E) conversion unit 1800. Since the received packets have address fields indicating the broadcast data, and including the node number of the transmitting terminal, which does not match the own node number, the route controllers I 1601 to VIII 1608 output these packets to both the buffers I to VIII and the sub transmission paths 160 to 167. With this control, the packet reaches all the terminals I 170 to VIII 177 connected to the node device II 602. The packets output to the buffers I to VIII are respectively written in the storage areas shown in Table 4 later, and the connection change unit 1701 reads out these packets so that they are transmitted without changing their channels. Subsequently, the same operations as in the node device II 602 are done in the node devices III 603, IV 604, and V 605, and the packet reaches all the terminals connected to these node devices. Finally, the packets input from the node device V 605 to the node device I 601 are output from the route controllers I 1601 to I 1607 onto only the sub transmission paths 160 to 167 since the node number of the transmitting terminal matches the own node number.

At this time, if the route controller I 1601 of the node device I 601 is inhibited from outputting any packet to the sub transmission path 160, the packet does not reach the transmitting terminal I 170 that output the packet.

In this way, the eight packets copied by the node device connected with the transmitting terminal hop through the network, and are distributed to the respective terminals at each node device, thus broadcasting the packet to all the terminals in the network.

Assume that a one-to-one communication is being made simultaneously with the broadcast communications in this network. Also, the broadcast communications are being made so that the terminal I 170 connected to the node device I 601 transmits data to all the terminals connected to the network, and the one-to-one communication is being made from the terminal I 170 connected to the node device V 605 toward the terminal I 170 connected to the node device III 603. At this time, in the buffer I 129 of the node device I 601, a broadcast communication packet arriving from the terminal I 170 are copied and written in the eight storage areas I to VIII in the dual port memory 205. On the other hand, one-to-one communication packets are distributed and written in FIFOs 206 in the buffers I 129 to VIII 136 in the node device I 601. In the buffer I 129, since the broadcast communication packet is written in all the storage areas I to VIII in the dual port memory 205, the read time from the storage areas I to VIII in the ST time increases, and the read time from the FIFO 206 considerably decreases or becomes zero. More specifically, of the one-to-one communication packets, a packet that must pass through the buffer I 129 in the node device I 601 has a shorter read time from the FIFO 206 as compared to those that must pass through other buffers II 130 to VIII 136. Hence, the output timing of that packet to the downstream node device II 602 is considerably delayed as compared to other packets.

In view of this problem, this embodiment is devised to avoid influences of broadcast communications on other communications.

First, the terminal I 170 as the broadcast transmitting terminal connected to the node device I 601 wraps a message indicating a broadcast communication start request in a packet, and sends that packet to the packet processor 1600 of the node device I 601. The packet processor 1600 recognizes that the information contained in this received packet is a broadcast transmission request, and outputs the packet to the read controller 409 in the buffer controller 150. The read controller 409 outputs a control packet for informing that broadcast communications are made from the terminal I 170 toward the read controller 409 of the node device V 605.

Upon receiving the control packet that informs the start of broadcast communications, the read controller 409 of the node device V 605 sets to deny or decrease packet outputs to the route controller I 1601 of the downstream node device so as to prevent packets from being output onto the channel connected to the transmitting terminal I 170 of the broadcast communications. This setup process is the same as that in the first to third embodiments. The read control of packets is done in the same manner as in the first to third embodiments, and packets stored in the storage areas in the dual port memories 205 of the respective buffers do not undergo this control.

The read controller 409 of the node device V 605 outputs a control packet that informs completion of the above-mentioned read control setups to the terminal I 170 as the transmitting terminal of the broadcast communications of the node device I 601.

Upon receiving the control packet that informs completion of the read control setups in the upstream node device V 605, the terminal I 170 of the node device I 601 starts the output of a broadcast communication packet.

Note that communications between the transmitting terminal and the read controller 409 in the node device connected with that terminal, communications between the read controller 409 in the node device connected with the transmitting terminal, and the read controller 409 in the upstream node device located upstream that node device, and communications between the read controller 409 in the upstream node device and the transmitting terminal are made by the method described in the first embodiment.

Upon completion of the broadcast communications, the terminal I 170 of the node device I 601 encapsulates a message indicating the end of the broadcast communications in a packet, and outputs that packet to the packet processor 1600 of the node device I 601. The packet processor 1600 recognizes that the information in the received packet is a broadcast transmission end report, and outputs the packet to the read controller 409. The read controller 409 outputs a control packet indicating completion of the broadcast communications in the terminal I 170 toward the read controller 409 of the node device V 605.

Upon reception of the control packet that informs the end of the broadcast communications, the read controller 409 of the node device V 605 cancels the setups that deny or decrease packet outputs to the route controller I 1601 in the downstream node device, and restores the normal read control.

As described above, when the node device of this embodiment is used, a considerable delay of some packets in other communications can be avoided during broadcast communications.

In the description of this embodiment, switches are used for channel selection, and optical transmission via an optical fiber is used between neighboring node devices. Alternatively, as described in the third embodiment, electrical signals may be transmitted between neighboring node devices. Also, this embodiment may also be used in the arrangement that uses the variable wavelength transmitters, and wavelength multiplexer and demultiplexer, as described in the first embodiment.

Furthermore, the node device shown in FIGS. 17 and 18 may be used.

TABLE 4

| Buffer | Write Address |
| --- | --- |
| Buffer I | A1 (Storage Area I) |
| Buffer II | A2 (Storage Area II) |
| Buffer III | A3 (Storage Area III) |
| Buffer IV | A4 (Storage Area IV) |
| Buffer V | A5 (Storage Area V) |
| Buffer VI | A6 (Storage Area VI) |
| Buffer VII | A7 (Storage Area VII) |
| Buffer VIII | A8 (Storage Area VIII) |

[Fifth Embodiment]

The first to fourth embodiments described above have explained the node device with the hardware arrangement, as shown in FIGS. 1, 12, 16, 17, 18, and 19. However, the present invention can also be applied to a computer apparatus such as a personal computer or the like.

When the computer apparatus practices the present invention, a program that executes the operations described in each of the first to fourth embodiments is stored in a storage medium such as a hard disk, floppy disk, CD-ROM, or the like, and a microcomputer such as a CPU (central processing unit) reads that program to implement the operations described in each of the first to fourth embodiments.

On the other hand, some operations described in the first to fourth embodiments may be implemented by the microcomputer.

More specifically, only the operations of the control unit 149 and packet processor 1600 may be implemented by the microcomputer, or only the operations of the control unit 149, packet processor 1600, and route controllers may be implemented by the microcomputer.

The operations to be implemented by the microcomputer are not limited to those described above.

In the above embodiments, wavelength multiplex communications have been described. Alternatively, the present invention may be applied to other multiplex communications such as frequency multiplex communications, code multiplex communications, and the like.

To restate, according to the present invention, the transmission capacity of the entire network can be flexibly used.

Also, the transmission capacity of the entire network can be effectively used.

Furthermore, the transmission capacity which is not used on the network can be effectively used.

Moreover, in a network that communicates data transmitted by a terminal device while distributing it onto a plurality of multiplexed channels, even when the transmission capacity that the terminal device can transmit is equal to or larger than a value obtained by subtracting the transmission capacity in each channel from the maximum transmission capacity of the channel, the terminal device can transmit data.

As many apparently widely different embodiments of the present invention can be made without departing from the spirit and scope thereof, it is to be understood that the invention is not limited to the specific embodiments thereof except as defined in the appended claims.

What is claimed is:

1. A control method for a communication system in which each of a plurality of node devices is connected to each other via a plurality of channels, and a receiving node device has a memory including a plurality of storage areas each of which corresponds to each of the plurality of channels, the control method comprising the steps of:

requesting a sending node device for transmitting signals from a first terminal device connected to said sending node device to a second terminal device connected to said receiving node device via the plurality of channels to restrain transmission of a third signal other than a first signal destined for the second terminal device via a predetermined channel among the plurality of channels;

writing a second signal received from the second terminal device and a part of the third signal received via the predetermined channel in a first storage area corresponding to the predetermined channel; and restraining the transmission of the third signal on the predetermined channel in said sending node device, without restraining transmission of other signals being transmitted via each of the plurality of channels other than the predetermined channel, in response to the request.

2. The method according to claim 1, wherein said sending node device transmits the first signal via the predetermined channel.

3. The method according to claim 1, wherein a plurality of terminal devices are connected to said sending node device and/or said receiving node device, each of the plurality of channels being connected to different terminal devices.

4. A control method for a receiving node device which is connected, via a plurality of channels, with a sending node device for transmitting signals by using the plurality of channels, wherein said receiving node device has a memory including a plurality of storage areas, each of which corresponds, to each of the plurality of channels, comprising the steps of:

requesting said sending node device configured to transmit signals from a first terminal device connected to said sending node to a second terminal device connected to said receiving node to restrain transmission of a third signal other than a first signal destined for the second terminal device via a predetermined channel among the plurality of channels; and writing a second signal received from the second terminal device and a part of the third signal received via the predetermined channel in a first storage area corresponding to the predetermined channel, wherein, in said sending node device the transmission of the third signal on the predetermined channel is restrained, without restraining transmission of other signals being transmitted via each of the plurality of channels other than the predetermined channel.

5. The method according to claim 4, further comprising a channel change step of connecting the first storage area to one of said plurality of channels so as to output the second signal stored in the first storage area onto one of said plurality of channels.

6. The method according to claim 5, wherein the channel change step includes step of changing the channel to be connected to the first storage area in accordance with a predetermined pattern.

7. The method according to claim 5, wherein the channel change step comprises a variable channel transmission step of outputting the second signal stored in the first storage area from one of said plurality of channels.

8. The method according to claim 5, wherein the channel change step includes the step of changing a connection between first storage area and one of said plurality of channels at predetermined time intervals.

9. The method according to claim 4, further comprising a separation step of separating, a desired signal sent via the predetermined channel from the predetermined channel.

10. The method according to claim 9, wherein a signal separated in the separation step is transmitted to the terminal device.

11. The method according to claim 9, wherein the control step includes a step of controlling traffic of a signal which is not separated in the separation step.

12. A control method for a sending node device connected via a plurality of channels with a receiving node device, comprising the steps of:

receiving a request signal for a sending node device configured to transmit signals from a first terminal device connected to said sending node to a second terminal device connected to said receiving node requesting to restrain transmission of a second signal other than a first signal destined for the second terminal device via a predetermined channel among the plurality of channels; and restraining the transmission of the second signal on predetermined channel, without restraining transmission of other signals being transmitted via each of the plurality of channels other than the predetermined channel, in response to the request received.

13. The method according to claim 12, wherein said sending node device transmits the first signal via the predetermined channel.

14. A communication system in which a sending node device is connected with a receiving node device via a plurality of channels, said receiving node device comprising:

a memory including a plurality storage areas each of which corresponds to each of the plurality of channels;

request means for requesting said sending node device for transmitting signals from a first terminal device connected to said sending node device to a second terminal device connected to said receiving node device via the plurality of channels, to restrain transmission of a third signal other than a signal destined for the second terminal device via a predetermined channel among the plurality of channels; and writing means for writing a second signal received from the second terminal device and a part of the third signal received via the predetermined channel in a first storage area corresponding to the predetermined channel, and said sending node device comprising:

restraint means for restraining the transmission of the third signal on the predetermined channel, without restraining transmission of other signals being transmitted via each of the plurality of channels other than the predetermined channel, in response to the request.

15. A receiving node device which is connected, via a plurality of channels, with a sending node device for transmitting signals by using the plurality of channels, comprising:

a memory including a plurality of storage areas each of which corresponds to each of the plurality of channels, for storing signals received from each of the plurality channels;

request means for requesting said sending node device configured to transmit signals from a first terminal device connected to said sending node device to a second terminal device connected said receiving node device to restrain transmission of a third signal other than the first signal destined for the second terminal device via predetermined channel among the plurality of channels; and writing means for writing a second signal received from the second terminal device and a portion of the third signal received via the predetermined channel in a first storage area corresponding to the predetermined channel, wherein, the transmission of the third signal on the predetermined channel is restrained in said sending node device, without restraining the transmission of other signals being transmitted via each of the plurality of channels other than the predetermined channel.

16. A sending node device connected via a plurality of channels with a receiving node device, comprising:

reception means for receiving a request signal for a sending node device configured to transmit signals from a first terminal device connected to said sending node to a second terminal device connected to said receiving node requesting to restrain transmission of a second signal other than a first signal destined for a first terminal device connected to said receiving node device via a predetermined channel among the plurality of channels; and restraint means for restraining the transmission of the second signal on the predetermined channel, without restraining transmission of other signals being transmitted via each of the plurality of channels other than the predetermined channel, in response to the request signal received by said reception means.

* * * * *

UNITED STATES PATENT AND TRADEMARK OFFICE
CERTIFICATE OF CORRECTION

PATENT NO.   : 6,819,651 B2
DATED        : November 16, 2004
INVENTOR(S)  : Kazuhiko Hojo and Atsushi Tamura It is certified that error appears in the above-identified patent and that said Letters Patent is hereby corrected as shown below:

Column 22,
Line 49, please delete "1601" and insert therefore -- I 601 --

Column 25,
Line 52, please delete "1503" and insert therefore -- I 503 --

Signed and Sealed this

Eighth Day of March, 2005

JON W. DUDAS
*Director of the United States Patent and Trademark Office*